United States Patent [19]
Ohkawa et al.

[11] Patent Number: 5,483,913
[45] Date of Patent: Jan. 16, 1996

[54] FLOATING STRUCTURES AND LOCKING DEVICE THEREOF

[76] Inventors: Hiroshi Ohkawa, 3-13-8, Minamigaoka, Nisshin-cho, Aichi-gun, Aichi-ken; Takao Nonoyama, 15, Hirashiba-cho 7-chome, Toyota-shi, Aichi-ken, both of Japan

[21] Appl. No.: 244,374

[22] PCT Filed: Dec. 24, 1993

[86] PCT No.: PCT/JP93/01891

§ 371 Date: Jun. 8, 1994

§ 102(e) Date: Jun. 8, 1994

[87] PCT Pub. No.: WO94/19231

PCT Pub. Date: Jan. 9, 1994

[30] Foreign Application Priority Data

Feb. 26, 1993 [JP] Japan ................... 5-063348

[51] Int. Cl.⁶ ........................ B63B 27/00
[52] U.S. Cl. .............. 114/264; 405/224; 114/267
[58] Field of Search .................... 114/264, 265, 114/266, 267, 263, 293, 258; 405/224, 227, 26

[56] References Cited

U.S. PATENT DOCUMENTS

| | | |
|---|---|---|
| 2,984,076 | 5/1961 | Bradley . |
| 3,237,414 | 3/1966 | Straub et al. ................ 114/258 |
| 3,496,586 | 2/1970 | Kaufman ...................... 114/267 |
| 3,533,240 | 10/1970 | Lesh ............................. 114/258 |
| 3,717,001 | 2/1973 | Tam ............................. 405/224 |

FOREIGN PATENT DOCUMENTS

| | | |
|---|---|---|
| 1.298.909 | 6/1962 | France . |
| 78.902 | 8/1962 | France . |
| 2.072.355 | 9/1971 | France . |

*Primary Examiner*—Jesus D. Sotelo
*Attorney, Agent, or Firm*—Oblon, Spivak, McClelland, Maier & Neustadt

[57] ABSTRACT

The floating structure 1 includes a sheet held at a predetermined position by a column 2 which is positioned at the bottom of the water or a cable body 8 in which one end thereof is fixed to the bottom, and a levee wall which is projected from the water surface at a marginal portion. A rigid member can be fixed to the sheet for improving rigidity. Furthermore, a floating body for weakening the wave 70 can be installed at the marginal portion of the floating structure 1.

2 Claims, 18 Drawing Sheets

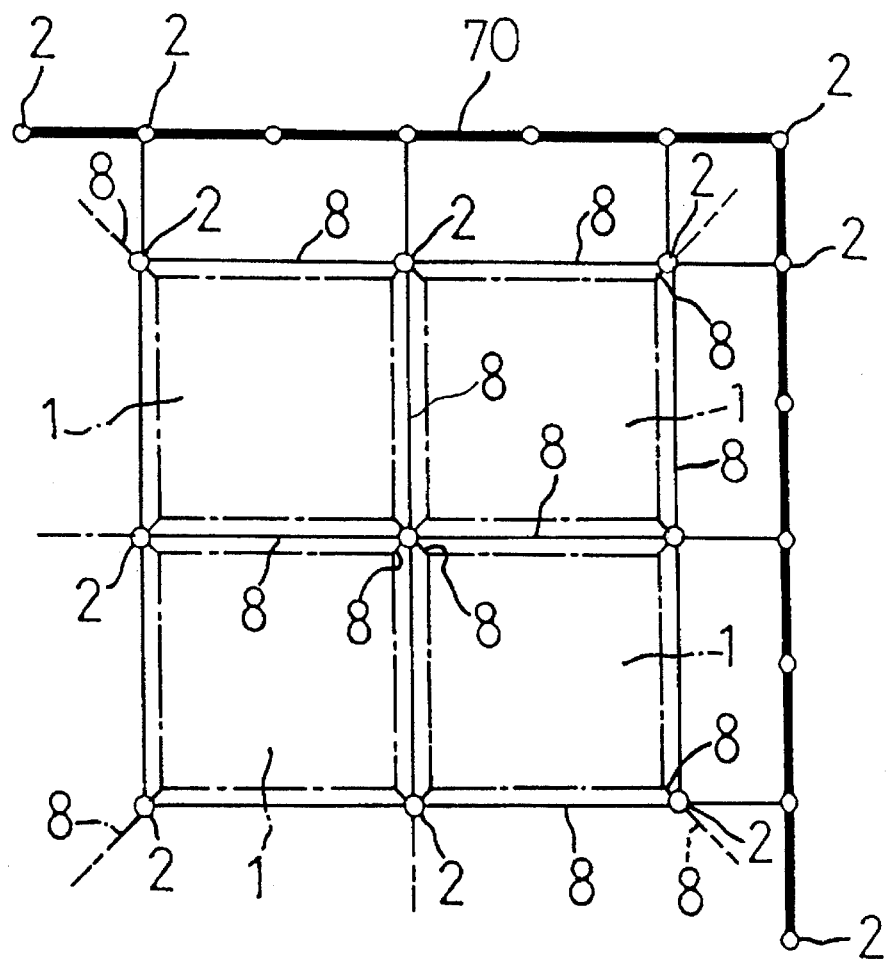
F I G. 16
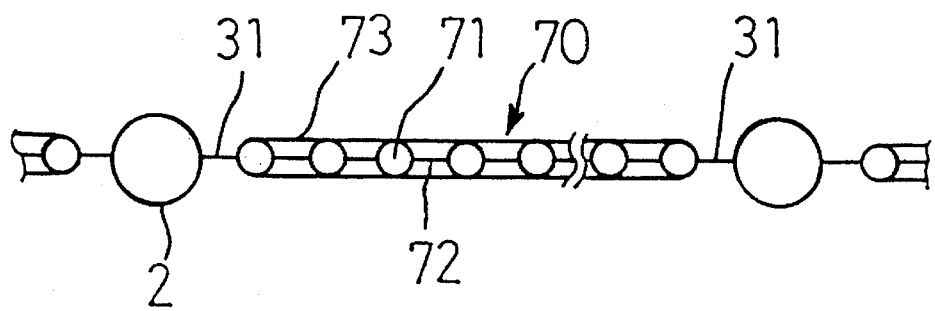
F I G. 17

FLOATING STRUCTURES AND LOCKING DEVICE THEREOF

BACKGROUND OF THE INVENTION

1. Technical Field of the Invention

This invention relates to a very large floating structure which is floated on the surface of water such as the surface of the sea or a lake surface. It is used as a planting area, an agricultural area or a facility area such as a solar panel installation area or a tennis court.

2. Background Art

Conventionally, an artificial island has been known as a kind of floating structure. The artificial island comprises a floating body which is installed under the surface of the sea, a platform which is installed on the surface of the sea and a plurality of columns of connecting the floating body and the platform. The artificial island is used as a submarine oil field camp. Since only the columns are influenced by the wave, the structure of the artificial island is hardly affected by the buoyancy fluctuation of the waves. The artificial island must be a rigid body having high strength because it supports the floating body and the platform. Thus, enormous expenses are needed for constructing the artificial island, and it results in heavy weight. Therefore, the artificial island can be used as a facility having high added value such as an artificial city. However, the cost is too expensive when the artificial island is used for facilities such as an agricultural area, a planting area and a solar panel installation area having a comparatively low added value. Therefore, it is difficult to build more facilities, and the spread of facilities is limited.

The present invention provides an inexpensive and lightweight artificial island where more floating structures are easily built and which floats on the surface of the water instead of a conventional expensive artificial island. It is an object of the present invention to provide a practical floating structure and a locking device thereof which are harmless to nature.

DISCLOSURE OF THE INVENTION

The floating structure according to the present invention comprises a sheet spread over the surface of water, the sheet being held in a predetermined position by a column which is positioned at the bottom of the water or a cable body in which one end thereof is fixed to the water bottom, and having a levee wall which is projected from the water surface at a marginal portion; and a rigid member which maintains the rigidity of the sheet.

The sheet principally seals water, so water doesn't penetrate through the sheet and doesn't ooze out the bottom surface to the top surface. As a result, buoyancy is generated at the bottom surface to support earth and sand which are disposed on the top surface. It is preferable that the sheet be a rubber sheet, a plastic film or a plastic sheet. All of them have flexibility. The sheet improves its strength since reinforced threads, reinforced wires or reinforced fibers are arranged and buried inside the sheet. The sheet having high strength is very convenient for stretching between columns. When the sheet has low tension, a cable body such as a rope or a belt can be used. There is no problem where the cable body and the sheet are integrally formed, or that the cable body is fixed to the sheet by other means.

The sheet has a levee wall which is projected from the water surface at the marginal portion. The levee wall prevents the sheet from being penetrated by water. A tubular wall filled with pressurized gas such as air can be used as the levee wall.

The rigid member provides the sheet with rigidity. The degree of rigidity depends on the purpose of use. Most of rigid members have sufficient rigidity such that unevenness isn't generated on the sheet when someone steps on it. A tubular bag filled with pressurized fluid can be used as the rigid member. When the pressurized fluid is gas, the rigid member can act as a float. When the pressurized fluid is water, the rigid member is not influenced by buoyancy. The tensile rigidity of the tubular bag filled with pressure fluid corresponds to the tensile strength of the sheet or film. The compressed rigidity of the tubular bag corresponds to the compressed pressure of the pressure fluid. The flexural rigidity of the tubular bag filled with pressure fluid corresponds to not only the tensile rigidity of the sheet or film but also the compressed pressure of the pressurized fluid.

A rigid plate can be used as the rigid member. There is no problem wherein the rigid plate is a polystyrene plate, a wood plate, an FRP floor plate, a metal rigid plate, a concrete plate, a light ceramic plate or a frame having a space located therein.

The rigid plate is two-dimensionally arranged on the sheet, so many rigid plates can cover the sheet. In this case, the whole sheet which is stretched between the columns maintains flexibility, and a part of the sheet acts as the rigid body. The rigid plate is fixed to the sheet by using an adhesive, fixed strings or fixed metal fittings. By utilizing buoyancy which is applied on the sheet and the weight of soil or other equipment installed on the rigid material, the rigid plate and the sheet can be pressed so as to be fixed. When a thin coating sheet covers the whole rigid plate, the rigid plate can be supported by the coating sheet and the sheet which is stretched between the columns. Furthermore, the rigid plate can be fixed more firmly by decreasing the pressure between the coating sheet and the sheet which is stretched between the columns.

In the present invention, the locking device of the floating structure comprises a plurality of columns which are located a predetermined distance from each other and in which the bottom portion is fixed at the bottom under the surface of the water and the top portion is projected near the surface of the water, and a cable body which is disposed between the two neighboring columns for integrally connecting the bottom side of one column and the top side of the other column. The floating structure is fixed on the top portion of the columns.

The column supports the load which is applied to the top portion thereof, and receives pressure in the axial direction. The cable body is a kind of string which is stretched between two columns. One end of the cable body is fixed to the top portion of one column to settle the column at the predetermined position on the surface of the sea. The other end of the cable body is fixed to the bottom portion of the other column. The top portion of one column is preferably fixed by three cable bodies which extend in radial directions. There is no problem that the cable body connects the top portion of one column and the bottom portion of the other column. Moreover, there is also no problem that the cable body connects the middle portion of one column and the bottom portion of the other column.

It is preferable that the columns are two-dimensionally erected at the bottom of the water with a predetermined distance between each other. It is desirable that the bottom end of the column is deeply buried in the bottom of the water, or that it is set up on a base which is fixed in the bottom. The base is produced as follows: a pit is dug by boring the bottom, a stake is inserted into the pit, and finally cement is poured into the pit to make the base. The column itself receives the pressure. It is desirable that the column is not bent by the pressure. In consideration of an anticorrosion objective, it is preferable that the column is a concrete pile or a fiber-reinforced rigid resin pipe. Then there is no problem that the column is also a tower which is made of metal having anticorrosion features, or a column frame having a truss structure.

It is preferable that the cable body can endure high tension, and that it is anticorrosive. It is also preferable that the cable body has the same specific gravity as that of water or sea water. The cable body may be a liquid crystal resin rope which is made of aromatic polyamide or of high polymerization and high crystallization polyethylene. Furthermore, the cable body may be a rope which is made of ceramic, resin or metal, or bar material, all of which have anticorrosive characteristics.

The floating structure is fixed to the top portion of the column at one end thereof to hold the predetermined position on the surface of the water.

When the depth is deep, the floating structure can be fixed by only cables without using the column.

A floating body for weakening the waves can be installed along the margin of the floating structure. Conventionally, a levee-shaped floating body for weakening the wave can be used as the floating body. The floating body comprises a levee-shaped portion which is projected from water's surface and a wall-shaped portion which spreads in a downward direction to the bottom of the water and in the horizontal direction along the margin. It is preferable that the floating structure has buoyancy which makes the levee-shaped portion float on the water surface. The floating body for weakening the waves preferably has the function of reflecting a wave. One side of the floating body can reflect a part of the wave, and the other side of the floating body can receive the rest of the wave. The floating body receives the force in the upward and downward direction, and it also receives the force in the horizontal direction such as a forward and backward direction. It is preferable that the force in the upward and downward direction is received by the buoyancy of the floating body and the cable body fixed at the bottom of the water. It is difficult for the force in the horizontal direction on the water's surface to be received by the cable body. It is preferable that the force in the horizontal direction be received by the large mass of the floating body. The direction of the force in the horizontal direction is traversed in accordance with the amplitude of the wave. Therefore, the floating body and the floating structure are not greatly moved by the wave.

The component of the floating structure according to the present invention is a very simple material such as a sheet or a plate, so the structure is simple and low in cost. Therefore, the floating structure according to the present invention can be used as an energy base, an agricultural area, or a green.

The sheet prevents water from penetrating therethrough, and it relieves stress concentration. On the other hand, the rigid plate provides rigidity on a narrow part along the width of the sheet. Therefore, the sheet can have a long length, and it also has rigidity so that people can work on it.

The floating structure according to the present invention comprises a floating body for weakening the wave which is disposed along the margin of the floating structure. Since the floating body reflects and weakens the wave, the wave which acts on the floating structure is weakened, and the safety of the floating structure is improved.

Since the floating structure comprises a sheet and a pressure pipe, it can flexibly deal with the movement of the water surface and the wave. A water wall is installed at the marginal portion of the sheet, and a pressure pipe filled with pressure fluid is integrally or separately installed on at least one of the upper surface or the lower surface of the sheet. Therefore, the sheet has greater rigidity on which a certain tensile force is applied.

As above described, the sheet can maintain a proper posture on the water surface, and the water wall and the pressure pipe is prevented from being deformed since the elastic force and the pressure fluid oppose the reaction of the outer force caused by the wave or the water. Therefore, the floating structure improves its strength and wear resistance.

In the floating structure according to the present invention, a space for multipurpose establishment such as a planting area or an agricultural area or a solar panel installation area can be obtained at the upper portion of the sheet which is spread over the water's surface for sealing water. The floating structure is light-weight and inexpensive. Furthermore, the floating structure is easily extended, the area for establishment is not limited, and is harmless to nature.

In the looking device of the floating structure according to the present invention, the load is applied on the column, and the cable body maintains the top portion of the column at the predetermined position. When the floating structure which is fixed between many columns is moved in a certain direction by receiving water flow or the force of the wind, the tensile force or the pressure is applied on the top portion of the column. As a result, the top portion of the column is likely to move in the direction in which the force is applied. The reaction force is applied on the cable body which is fixed to the top portion at one end thereof. The force which is applied on the top portion of the column is in the horizontal direction. The reaction force is in the direction in which the cable body extends, namely, a direction which inclines diagonally downward. The reaction force is divided into two directions; the horizontal direction and the vertical direction. As compared with the force in the horizontal direction which moves the floating structure, the reaction force in the horizontal direction has the same power, and it is in a 180° reverse direction. The reaction force in the vertical direction presses the column through the column downwardly. This force is applied on the earth at the bottom of the water through the column. Namely, the force pushes the column into the earth.

The force is applied on the bottom side of the column to which the other end of the cable body is fixed. This force has the same power as that which is applied on the top side of the column, and has a 180° reverse direction. Namely, the force stretches the bottom portion in the horizontal direction. The force in the horizontal direction has the same power as that which is applied on the top portion of the column, and has a reverse direction. On the other hand, the force in the vertical direction is a tensile force in the vertical direction. Namely, the force draws the column from the earth. The force in the vertical direction has the same force as that which is applied on the top side of the column, and has a reverse direction.

The forces applied on the top side and the bottom side of the column by one cable body are different from each other because the column to which the cable body is fixed is different. One force presses the column to the earth, and the other force draws the column from the earth. However, when many columns are disposed and combined by a multiple of cable bodies, one force presses the top side of the cable body, and the other force draws the bottom side of the column. On average, the above two forces cancel out each other, so the force is applied on the column only in the compressed direction. As a result, the force neither presses nor draws the column. In fact, the forces which are applied on the top portion of the column are a little bit different from each other, so the force which is applied on the earth remains. However, the force becomes small.

The force which is applied on the bottom side of the column in the horizontal direction is also applied on the earth. Namely, the force which is applied on the top portion of the column in the horizontal direction is transmitted to the bottom side of the column, and then it is applied on the earth. However, the position of the force which is applied on the column is on the bottom side, near the earth, so the torque which forces the column down becomes small.

In the locking device of the floating structure according to the present invention, the force is applied on the top portion of the column in the horizontal direction in order to control the movement of the floating structure caused by water flow or wind force. This force in the horizontal direction is supported by the column or the cable body, and it becomes the force which compresses the column in the axial direction or the force which presses the bottom side of the column in the horizontal direction. Namely, the force which is applied on the top portion of the column is converted into a force which is applied on the bottom side of the column. Therefore, the torque which forces the column down is reduced, and the load which is applied on the column becomes light.

The fixed foundation on the bottom side of the cable body is also used as the foundation of the column. Therefore, it is not necessary to make a new foundation for the cable body, so the workload is reduced and simplified.

The first floating structure according to the present invention comprises a sheet spread over the water's surface and is fixed to the column and to a rigid plate which is disposed at the top surface or the bottom surface of the sheet.

The sheet is fixed to the column, and it spreads over the water's surface two-dimensionally. Namely, the sheet is stretched between a multiple of columns, and it is always under tension.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 16 is a plan view showing the locking device of the floating structure according to the third preferred embodiment.

FIG. 17 is a partial plan view showing the floating body for weakening the wave of the locking device of the floating structure according to the third preferred embodiment.

BEST MODES FOR CARRYING OUT THE INVENTION

Having generally described the present invention, a further understanding can be obtained by reference to the specific preferred embodiment which is provided herein for purposes of illustration only and is not intended to limit the scope of the appended claims.

First Preferred Embodiment

Figure 1:
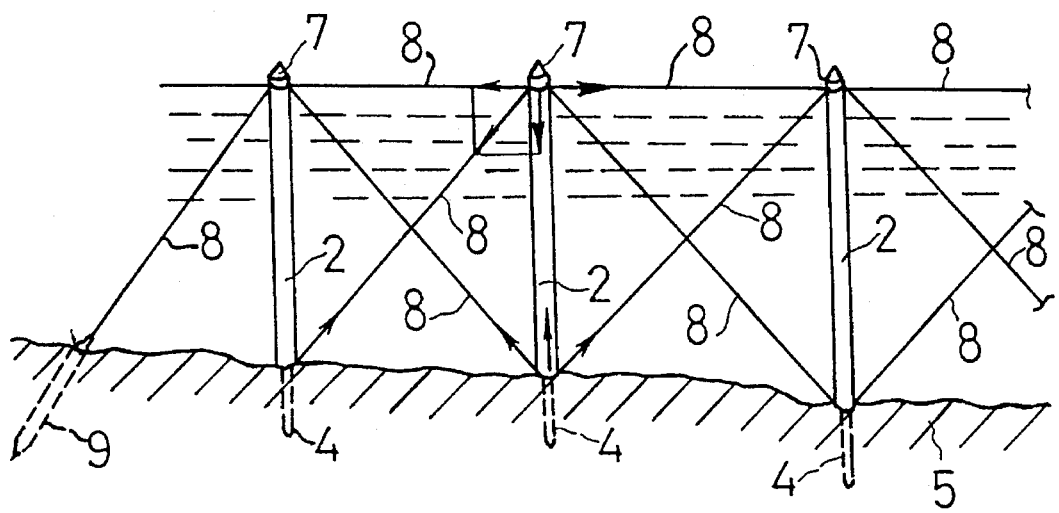
FIG. 1 is a perspective view showing the locking device of the floating structure according to the first preferred embodiment.
Figure 2:
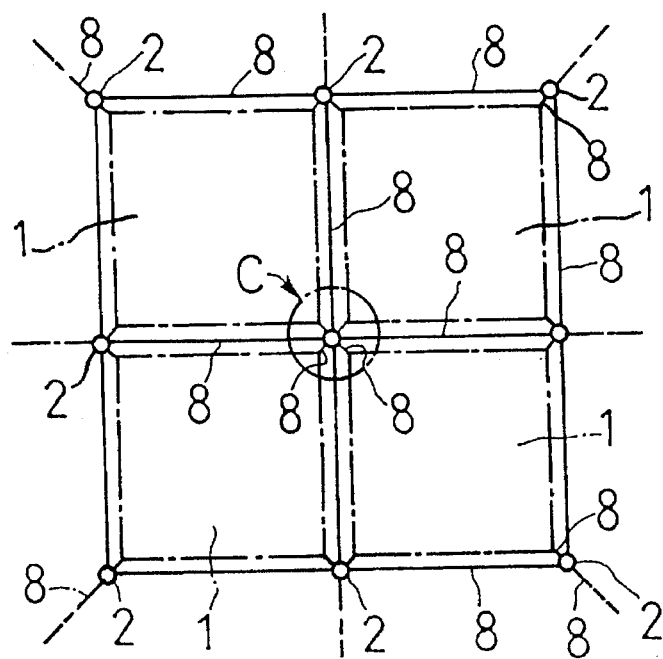
FIG. 2 is a plan view showing the locking device of the floating structure according to the first preferred embodiment.
Figure 3:
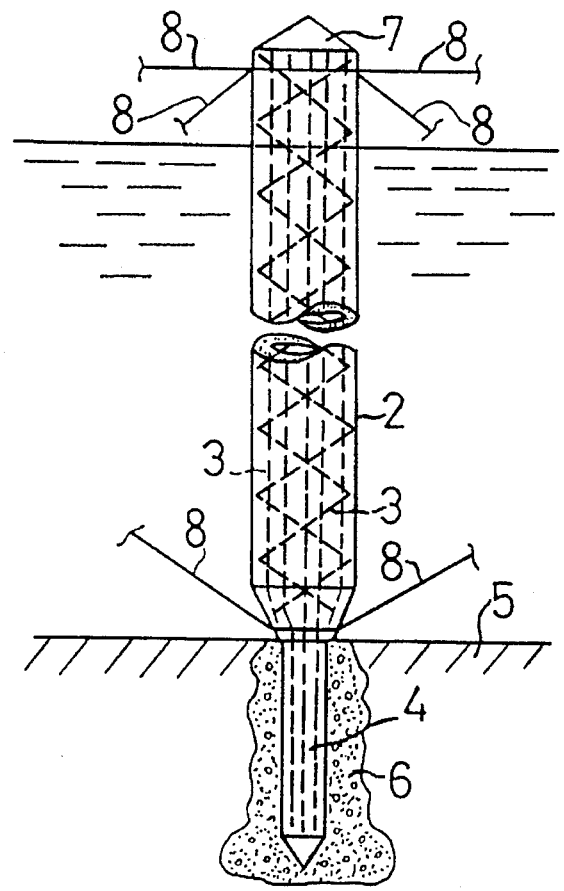
FIG. 3 is a schematic view showing the column of the locking device of the floating structure according to the first preferred embodiment.

A first preferred embodiment discloses an imaginary locking device of the floating structure. As shown in FIGS. 1 and 2, the locking device forms a floating structure 1 into the shape of a square in which one side is about 50 m from the viewpoint of plane surface. The clearance between one column 2 and the other column 2 is about 50 m. As shown in FIG. 3, the column 2 is made of concrete, and the shape is a cylindrical tube having a diameter of about 1 m and a height of about 100 m. A metal bar material 3 is constructed inside the column 2 as a reinforced material to strengthen the structural strength in the axial or radial direction. The column 2 is driven into sea bottom 5, and cement 6 is poured to solidify the column 2. The column 2 is integrally built in the straight condition on a base stake 4 which is integrally installed into sea bottom 5. The top portion 7 of the column 2 is projected from water surface, and the column 2 is integrally connected to the top portion 7 by way of the corner portion of the floating structure 1 and a wire rope 8. The column 2 forms an apex of a square, and the bottom portion 4 of one column 2 and the top portion 7 of the other column 2 are integrally connected between two columns 2 and 2 by the rope 8 which is made of aromatic polyamide and which is used as the connecting member while maintaining the predetermined tension. As a result, the column 2 obtains a fixed position. Furthermore, the column 2 constituting the marginal portion is integrally connected at its outer side to a stake 9 which is integrally installed into sea bottom 5 by way of the rope 8 while maintaining the predetermined tension. As a result, the column 2 obtains a fixed position.

Concerning the above locking device of the floating structure according to the first preferred embodiment, the rope 8 connects the bottom portion 4 of one column 2 and the top portion 7 of the other column 2 between two columns 2, 2. In this structure, it is possible to disperse and absorb a variety of complicated external forces which are received from the floating structure 1 and which are caused by water flow and wind force. As a result, a plurality of columns 2 reinforces their structural strength and they can obtain fixed position. Namely, since the columns 2 are connected by the rope 8, the external force received from the floating structure can be dispersed and absorbed effectively and correctly by the component force effect of the connecting structure between the column 2 and the wire rope 8 as shown in the arrow in FIG. 1. Therefore, the top portion of the column 2 obtains a fixed position.

As above described, in the locking device of the floating structure according to the first preferred embodiment, the floating structure 1 attached between a plurality of columns 2 can be maintained stably and smoothly at the predetermined position in proper posture.

Figure 4:
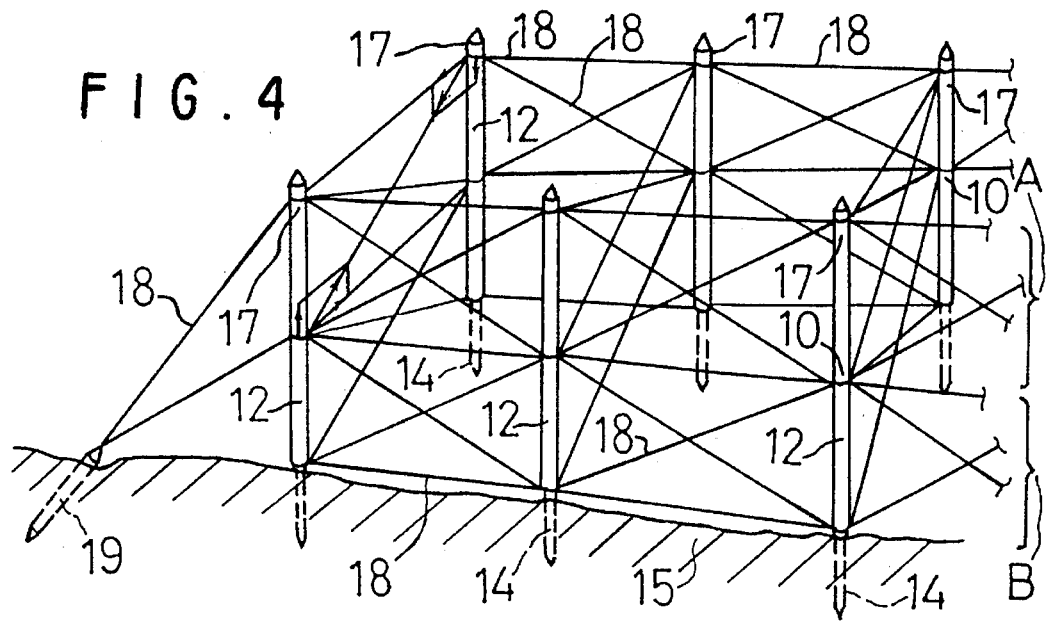
FIG. 4 is a perspective view showing another modification of the locking device of the floating structure according to the first preferred embodiment.

The locking device of the floating structure according to the first preferred embodiment is not limited to the above type. For example, when the depth of the water is deep or when the influence of external forces is remarkable, the column 12 is divided into the upper side A and the lower side B at the middle portion 10 in the axial direction as shown in FIG. 4. In this case, rope 18 can be prepared in a multistage arrangement. Namely, the rope 18 connects between the top portion 17 of one column 12 and the middle portion 10 of the other column 12 between two columns 12 and 12, and it also connects the bottom portion 14 of one column 12 and the middle portion of the other column 12 between two columns 12 and 12. Furthermore, the rope 18 can select the following connecting combinations: one is between the top portion 17 of one column 12 and the other column 12, another is between the middle portion 10 of one column 12 and the middle portion 10 of the other column 12, and the other is between the bottom portion of one column 12 and the bottom portion 14 of the other column 12.

Figure 5:
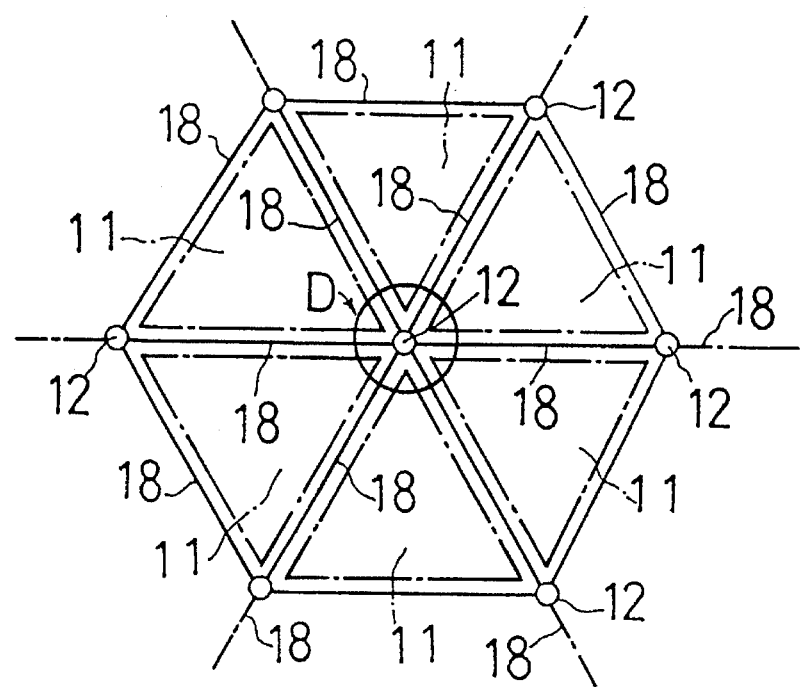
FIG. 5 is a plan view showing an additional modification of the locking device of the floating structure according to the first preferred embodiment.

The above variations have the same functions and effects as the locking device of the floating structure according to the first preferred embodiment. The arrangement of multiple columns 12 is not limited to the shape of a square described in the first preferred embodiment. It can be not only a circle or rectangular but also a triangle or hexagon as shown in FIG. 5. Furthermore, as above described, the rope 18 can connect multiple columns 12, and a triangular floating structure 1 can be provided, thereby obtaining the same functions and effects as the locking device of the floating structure according to the first preferred embodiment.

Second Preferred Embodiment

A second preferred embodiment discloses an imaginary locking device of the floating structure. As shown in FIG. 2, the locking device forms a floating structure 1 into the shape of a square in which one side is about 50 m from the viewpoint of a plane surface. In FIG. 2, four floating structures 1 are connected with each other. As shown in FIGS. 2 and 4, the floating structure 1 comprises a sheet 20 which is maintained between a multiple of columns 2 and which spreads over the water surface, and a floor plate 21 is provided which is disposed at the upper surface of the sheet 20 and maintains the rigidity of the sheet 20.

The columns 2 are built in a two-dimensional direction with a distance of 50 m between each other, and there are nine columns total. The bottom portion of these columns is fixed to water bottom, and the top portion of these columns is projected near the water surface. The column 2 is the same as the one which is used in the first preferred embodiment.

Figure 6:
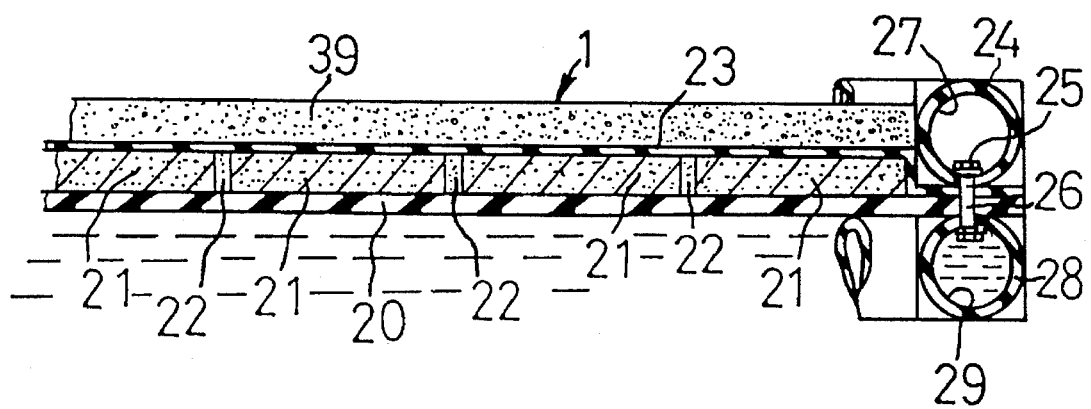
FIG. 6 is a sectional view showing the locking device of the floating structure according to the second preferred embodiment.

The sheet 20 is impermeable and forms a square rubber sheet in which one side is about 50 m and has a thickness of about 5 mm. Multiple solid rectangular FRP floor plates 21 are spread over the upper surface of the sheet 20 as rigid plates in order to maintain the rigidity caused by the load of the fixing objects. A packing 22 made of sponge rubber is filled within the clearance between the floor plates 21 to be integrally connected thereto. The upper surface of the floor plates 21 is coated with a rubber sheet 23 as a soft sheet which is integrally supported with the floor plate 21 and the sheet 20 and the thickness thereof is about 3 mm. The pressure between the sheet 20 and the rubber sheet 23 is reduced to obtain vacuum condition, so the floor plate 21 can be firmly supported by the sheet 20 and the rubber sheet 23 to prevent relative displacement of the floor plate 21. As shown in FIG. 6, a cross-sectional circular and hollow pressure tube 24 is integrally fixed to the upper surface of the marginal portion of the rubber sheet 23 in all directions as a water-proof wall. The rubber sheet 23 is integrally fixed to the pressure tube 24 by a bolt 25 and a nut 26 as fixing tools through the sealing member to obtain excellent airtightness. The pressure tube 24 is a rubber sheet with a thickness of about 5 mm and the inner diameter is about 2 m. The tube 24 is filled with high pressure air 27. As shown in FIG. 6, a cross-sectional circular and hollow pressure tube 28 is integrally fixed to the lower surface of the marginal portion of the rubber sheet 20 as a frame wall by a bolt 25 and a nut 26 to obtain excellent airtightness. The pressure tube 28 is a rubber sheet with a thickness of about 5 mm and an inner diameter of 2 m and is filled with high pressure water 29.

Figure 7:
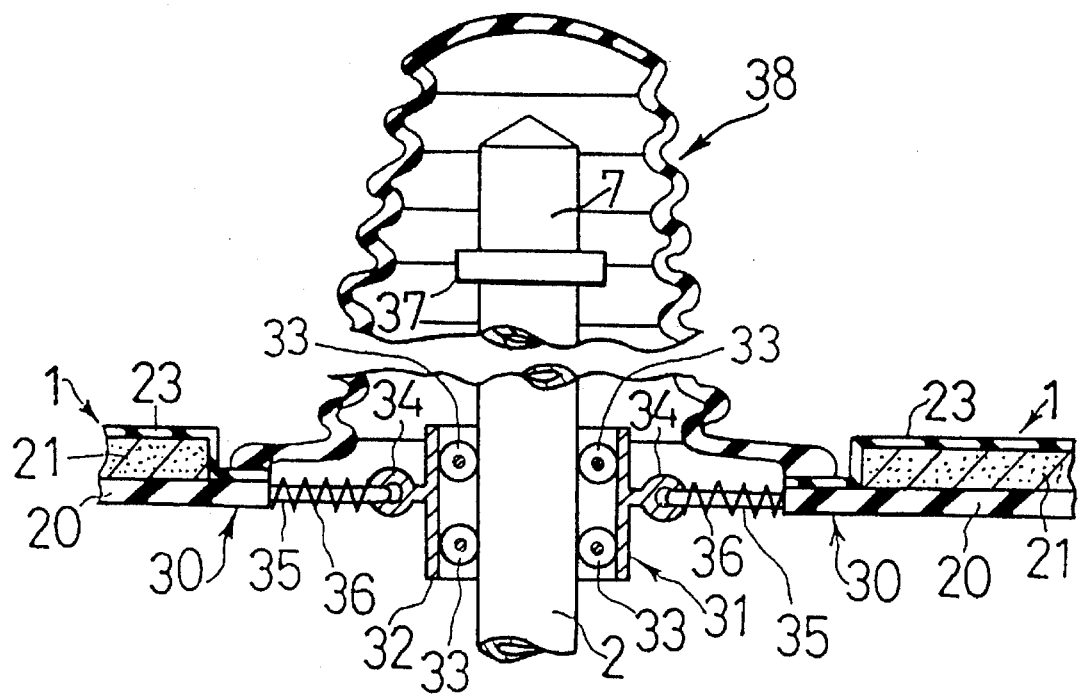
FIG. 7 is a sectional view showing the construction of a column of the looking device of the floating structure according to the second preferred embodiment.

In the second preferred embodiment, as shown in FIG. 2, the floating structure is integrally connected to the column 2 in all directions by the ropes 8 so as to be disposed at the predetermined position on water surface. The pressure tube is connected to a high pressure air supply source (not shown) which is filled with high pressure air at the appropriate position. The pressure tube 28 is connected to a high pressure air supply source (not shown) which is filled with high pressure water at the appropriate position. As shown in FIG. 7, each angular position 30 of four floating structures in the second preferred embodiment is collected and locked in position with respect to each other (shown at C in FIG. 2 and at D in FIG. 5) so as to be integrally connected to the column 2. Namely, the central column 2 is equipped with a sliding member 31 which is freely reciprocated in the axial direction. The sliding member 31 comprises a frame body 32 which is positioned on the column 2 around the axis thereof and a plurality of rolling bodies 33 which are maintained inside the frame body 32. The rolling bodies 33 are contacted to the outer wall of the column 2 and are movable in the axial direction of the column 2. A plurality of projected engaging portions 34 are installed in the radial direction of the outer periphery portion of the frame body 32. The engaging portions 34 are connected to the angular portion 30 of the floating structure 1 by way of a linkage member 35. The linkage member 35 is equipped with a spring member 36 by which the engaging portion 34 is kept close to the angular portion 30 at the outer periphery. A stepped portion 37 is disposed at the top portion 7 of the column 2, so detachment of the sliding member 31 from the column 2 is prevented. A cover 38 covers the axis of the column 2, has a bellows and includes the angular portion 30 of four floating structures 1 to prevent water from penetrating therein.

The above floating structure 1 of the second preferred embodiment comprises the sheet 20 which spreads over water surface and the floor plate 21 which is integrally connected to the sheet 20 by way of the rubber sheet 23. Since this is a flexible structure, it is possible to flexibly correspond to a variety of complicated external forces such as water flow and wind force. The floor plate 21 maintains rigidity at the limited position. Since the floor plate 21 and the rubber sheet 23 are disposed on the upper surface of the sheet 20, rigidity of the floating structure 1 is increased.

The floating structure 1 can be used as an agricultural area by loading earth and sand 39 thereon.

The floating structure 1 is reciprocatively disposed in the axial direction of the column 2 by way of the sliding member 31, so the relative relation between the position of the floating structure 1 and the position of the column 2 in the axial direction can be maintained appropriately and stably corresponding to the change of sea level (i.e., high tide through low tide). One floating structure 1 is close to the other floating structure 1 in the direction against the axial direction of the column 2. The sheet 20 is likely to spread over the water's surface because the tension is applied on the sheet 20. The sliding member 31 can be used as a linkage device between the column 2 and the sheet 20, or it can be used as the entire linkage portion between the column 2 and the sheet 20.

Concerning the floating structure 1 of the second preferred embodiment, most of main components are made of rubber material and plastic material which are reinforced by a reinforced lanyard or a reinforcing thread. As a result, the floating structure i shows excellent anticorrosion characteristics, the manufacturing process is very easy and the cost is low.

Figure 8:
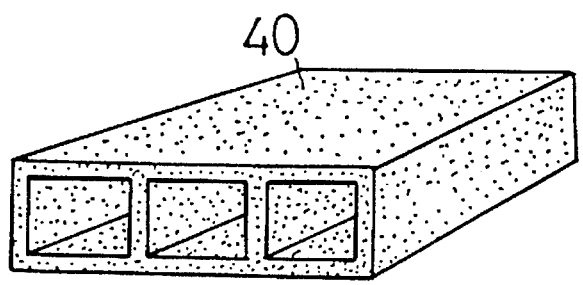
FIG. 8 is a perspective view showing other modifications of the rigid plate of the looking device of the floating structure according to the second preferred embodiment.

The rigid plate of the floating structure is not limited to the above materials. As shown in FIG. 8, an internal hollow block 40 which is made of light concrete and in which the wall is reinforced by metal wire rod, and a polystyrene foam block can be used.

Figure 9:
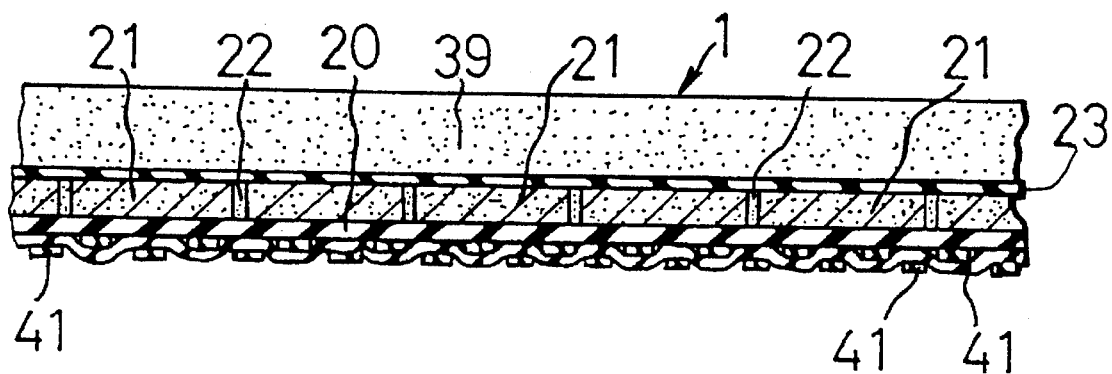
FIG. 9 is a sectional view showing another modification of the locking device of the floating structure according to the second preferred embodiment.
Figure 10:
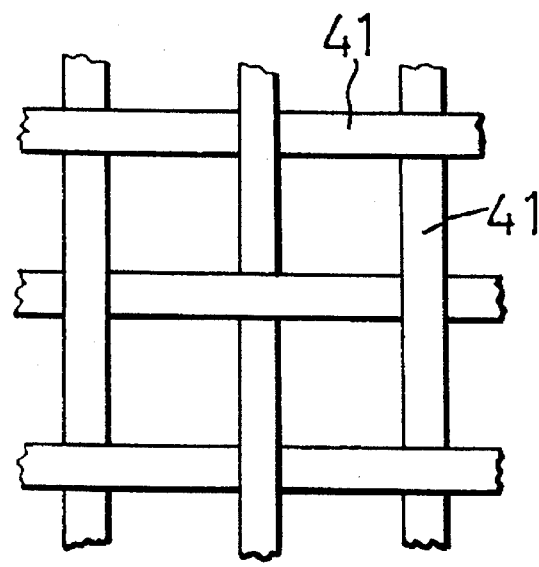
FIG. 10 is an enlarged plan view showing a further modification of the locking device of the floating structure according to the second preferred embodiment.
Figure 11:
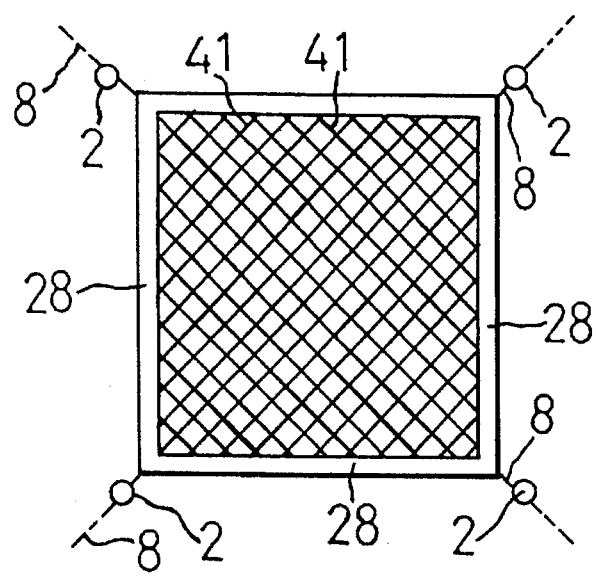
FIG. 11 is a plan view showing an additional modification of the locking device of the floating structure according to the second preferred embodiment.

As shown in FIGS. 9 and 11, the sheet 20 spread over water surface is used with a net-structure reinforced member in which one belt 41 lies at right angles to the other belt 41 in the longitudinal direction, thereby increasing anti-tensioning.

Figure 12:
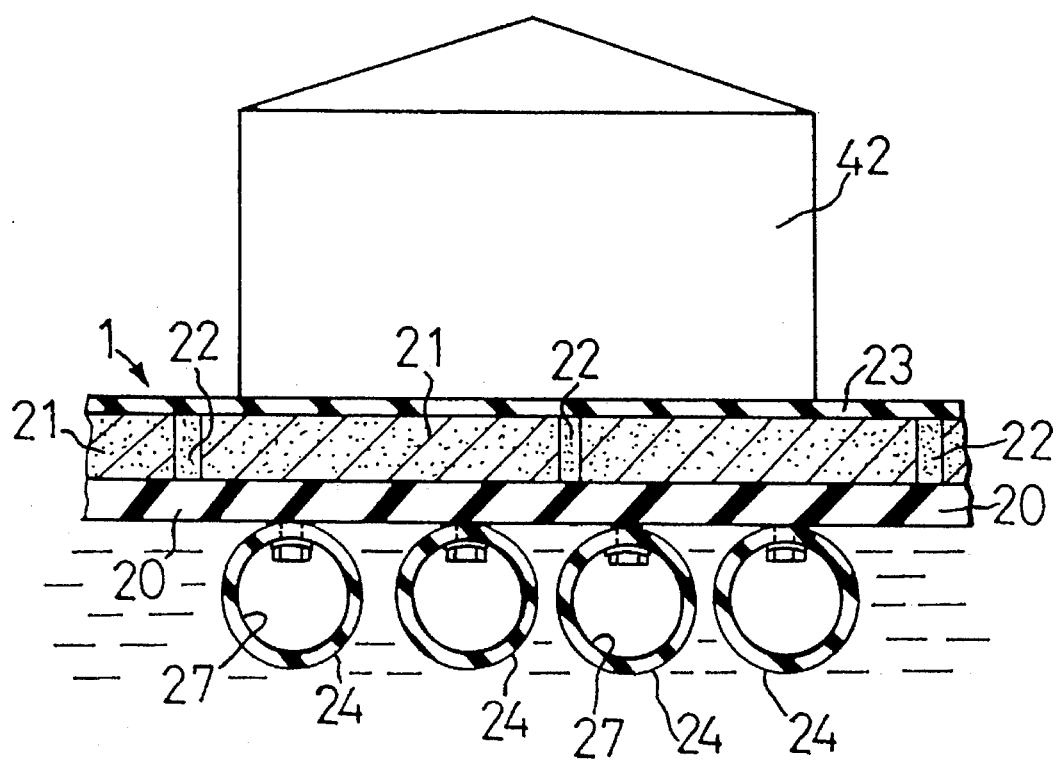
FIG. 12 is a main sectional view showing the condition wherein the fixed object is settled in the locking device of the floating structure according to the second preferred embodiment.

As shown in FIG. 12, when a heavy building 42 is loaded on the upper surface of the floating structure 1 of the second preferred embodiment, the pressure tube 24 is disposed to the lower surface of the sheet 20 as the float filled with gas in the range of a plane of projection of the building 42. The pressure tube 24 provides the sheet 20 with buoyancy which can resist the load of the building 42, so the application of stress on the sheet 21 is prevented. The part of the sheet 20 to which the pressure tube 24 is disposed has high rigidity, and the load of the building 42 improves its stability. When a road for automobiles is installed on the sheet 20, the pressure tube 24 is very useful. When no buoyancy is needed, the pressure tube 24 is filled with high pressure water to improve rigidity.

Figure 13:
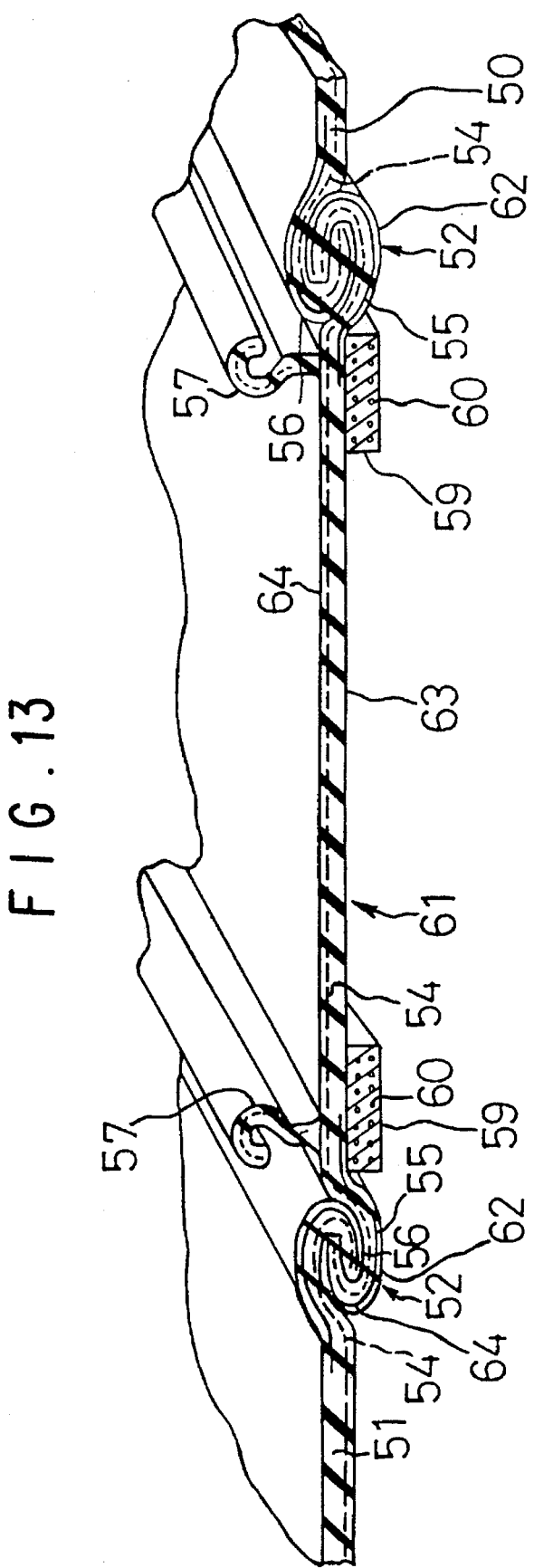
FIG. 13 is an enlarged sectional perspective view showing other modifications of the sheet of the looking device of the floating structure according to the second preferred embodiment.
Figure 15:
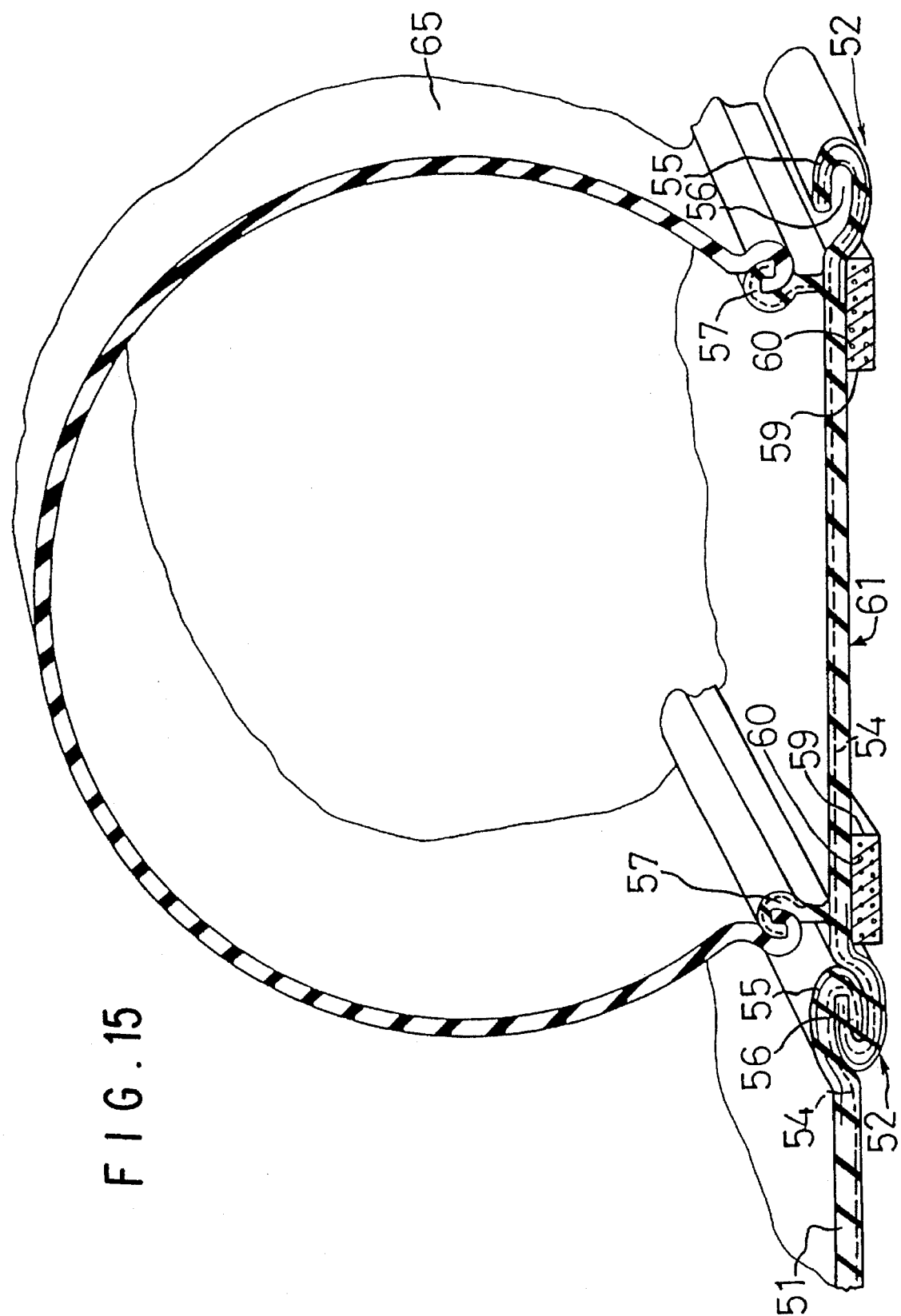
FIG. 15 is an enlarged sectional perspective view showing a further use of the sheet of the locking device of the floating structure according to the second preferred embodiment.
Figure 18:
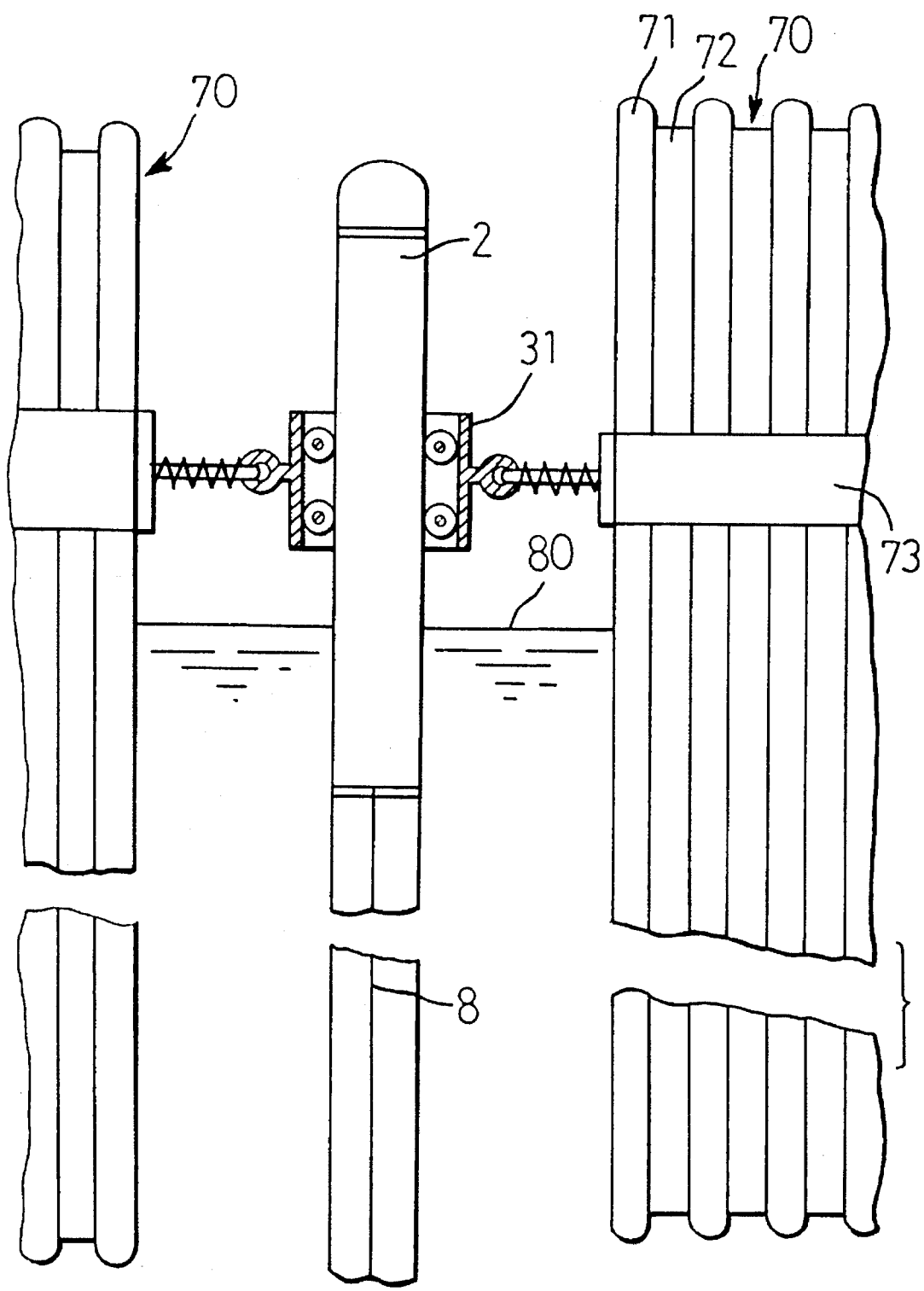
FIG. 18 is a partial enlarged elevational view showing the floating body for weakening the wave of the locking device of the floating structure according to the third preferred embodiment.

As shown in FIGS. 13 and 15, a sheet main body 51 and an engaging belt body 61 can be used as the sheet 20.

Figure 14:
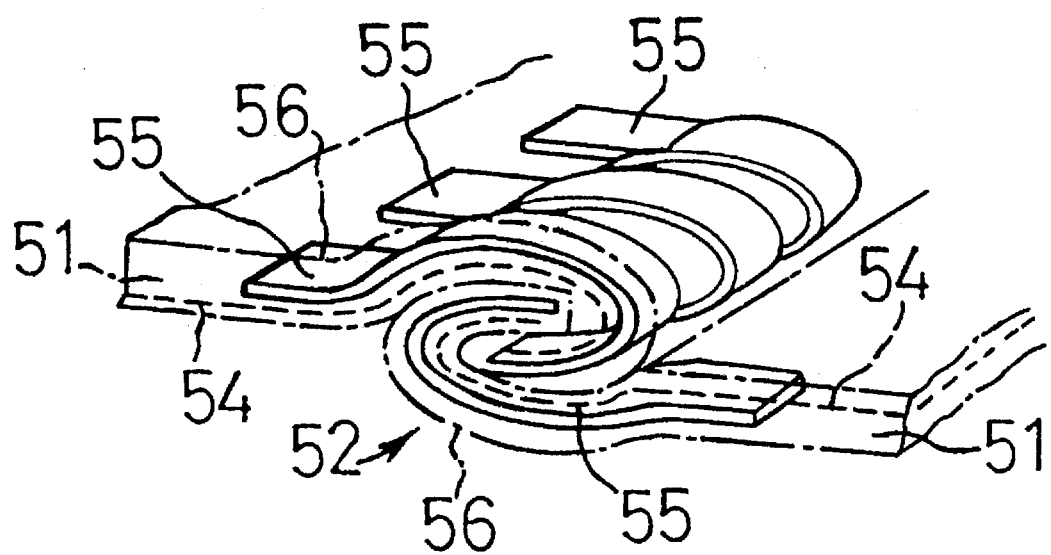
FIG. 14 is a main perspective view showing the connecting portion of the sheet of the locking device of the floating structure according to the second preferred embodiment in FIG. 13.

As shown in FIG. 14, the sheet main body 51 is made of belt-shaped cloth material in which both edge portions 56, 56 are in the shape of a hook. The sheet cloth material is manufactured in such a manner that a reinforced cloth 54 made of aromatic polyamide fiber is disposed at the middle portion of a vulcanized rubber layer and that a hook-shaped metal fitting 55 which is similar to the both edge portions 56 and 56 is installed in the longitudinal direction of the sheet 20 at a predetermined distance from each other. The sheet cloth material is cut into a rectangle having a predetermined length, and the obtained pieces are lined in rows. One edge portion 56 is connected to the neighboring edge portion 56 at the contacting portion by means of adhesives, and two edge portions are combined in the shape of a hook. The metal fitting 55 is pressed in the direction of the thickness to be plastic-deformed. Both edge portions 56 and 56 are watertightly connected by the rigidity of the metal fitting 55. Therefore, a square sheet can be obtained. Concerning the four sides of this sheet, a pair of opposite sides correspond to both edge portions 56 and 56. The rest of the sides are connected to the hook-shaped edge portions 56 and 56 in which the metal fitting 55 is installed, or part of the sides is vulcanized to form the hook-shaped edge portion 56. Therefore, the sheet main body 51 can be obtained.

The hook portion of both edge portions 56 and 56 of the sheet cloth material can be bent to either the front surface or the rear surface. Moreover, one edge portion 56 can be bent to the front surface and the other edge portion 56 can be bent to the rear surface. The sheet cloth material is cut into a rectangle, and the obtained pieces are lined and connected with each other. As a result, it is easy to obtain a square sheet main body or a rectangular sheet main body which has a predetermined length. Since both edge portions 56 and 56 are combined and the metal fitting 55 is plastic-formed, high workability can be obtained. Furthermore, the connecting portion 52 is reinforced by the metal fitting 55, so the obtained sheet main body 51 has great strength.

A connecting belt body 61 comprises a long belt-shaped main body 63, belt-shaped reinforced lanyards 60, 60 which are integrally connected to both edge portions of the rear side of the main body 63, and engaging projection walls 57, 57 which are integrally projected to both edge portions of the front side of the main body 63. The main body is identical to the sheet cloth material which is described above, and both edge portions 62 and 62 are also in the shape of a hook. The main body 63 is manufactured in such a manner that a reinforced cloth 64 made of aromatic polyamide fiber is disposed at the middle portion of a vulcanized rubber layer and that a hook-shaped metal fitting 65, which is similar to both edge portions 62 and 62, is installed in the longitudinal direction of the sheet with a predetermined distance between each other. The reinforced lanyard 60 is manufactured in such a manner that a plurality of reinforced fibers are arranged in the longitudinal direction, installed into the rubber, and vulcanized to be formed. As a result, the connecting belt body 61 improves its tensile strength in the longitudinal direction. The engaging projection wall 57 is connected with other components. In this case, the structure of the engaging projection walls 57 and 57 is identical to both edge portions 56 and 56 of the sheet main body 51.

When the connecting belt body 61 is used only for connecting the sheet main bodies 51 and 51, no engaging projection wall 57 is needed. When it is necessary to connect the rear surface of the engaging projection wall 57 with other components, the engaging projection wall can be disposed to the rear surface. The number of engaging projection walls is not limited to two. One engaging projection wall or three engaging projection walls can be used.

The connecting belt body 61 can be used as a marginal portion of the floating structure. This is shown in FIG. 15. One edge portion 62 of the connecting belt body 61 is connected and fixed to the edge portion 56 of the sheet main body 51, and the other edge portion 62 comprises a free end. Two rows of the engaging projection walls 57 and 57 of the connecting belt body 61 are engaged and fixed to both edge portions of the sheet cloth material 65 by means of adhesives to form a big tube. The tube is filled with pressurized air, and functions as a water-proof wall.

Third Preferred Embodiment

A third preferred embodiment discloses an imaginary locking device of the floating structure. As shown in FIG. 16, the floating body 70 for weakening the wave is disposed at the upper side and the right side of the floating structure 1.

The floating body 70 comprises a column 2, a steel pipe 71, a sheet 72, and a belt 73. Thirteen sticks of the column 2 are positioned at the bottom of the water and separated by a 50 m distance from each other so as to be in the shape of a hook. The hook-shaped columns 2 are at a distance of 50 m from the columns which support the floating structure 1. The steel pipe 71 has a diameter of about 50 cm, and both ends are closed. The lower internal closed space of the steel pipe is filled with concrete (not shown) as weight, and the upper internal closed space functions as float. The sheet 72 is a rubber sheet in which a fiber reinforced cloth is included to connect the steel pipes 71 so as to have a predetermined distance between each other. The belt 73 is a rubber belt in which reinforced fiber is included and fixes the upper portion of the steel pipe 71, which is disposed parallel with the sheet 72, from both sides to be disposed between columns 2. A sliding member 31 is connected to the steel pipe 71 so as to be movable in the upper and lower direction, and the belt 73 is fixed to the sliding member 31. As above described, the sheet 72 connects the steel pipes 71 so as to form a fence. An upper portion of the fence is projected from water surface 80, and a second lower portion of the fence sinks into water. When no water flows, the fence is built vertically.

The fence breaks the wave at the outer portion, and the wave can pass only through the lower end of the fence. Since the floating body 70 practically breaks the wave, the wave cannot be transmitted to the inner side of the floating body 70. The fence of the floating body 70 is connected to the belt 73 at the upper portion. When water flows, the fence is inclined by water flow to let the water flow. As a result, the tensile load is decreased. Since the sheet 72 connects the steel pipes 71 and 71, the steel pipe 71 in the connecting direction is flexibly bent. As a result, when a large force is applied to the steel pipe 71, only the portion to which the force is applied is deformed and the stress is not intensively applied. Therefore, the floating body 70 shows high durability. Concerning the floating body 70, the steel pipe 71 extends in the upper and lower direction, so the floating body 70 is very stiff. Thus, the steel pipe 71 is not bent by the wave.

The floating body 70 of the present invention is held by the column 2, and can be curved in the horizontal direction. A stiff wall-shaped floating body can be used instead of the floating body 70. The stiff wall-shaped floating body is not bent against the pressure of the wave so that only the force in the horizontal direction which reverses in accordance with the cycle of the wave acts on it. A known rigid structure such as truss structure is used for the rigidity of the floating body. It is necessary to shut off the water with a sheet or an appropriate plate material in order that the water cannot penetrate through the floating body. Furthermore, it is preferable that the floating body is fixed to the floating structure in order that the floating body can endure the force in the horizontal direction. Since the floating structure is heavy, it cannot move in spite that of the fact that a large force acts on the floating body, thereby reflecting the wave. Therefore, the wave cannot be transmitted over the reflected wave.

Fourth Preferred Embodiment

Figure 19:
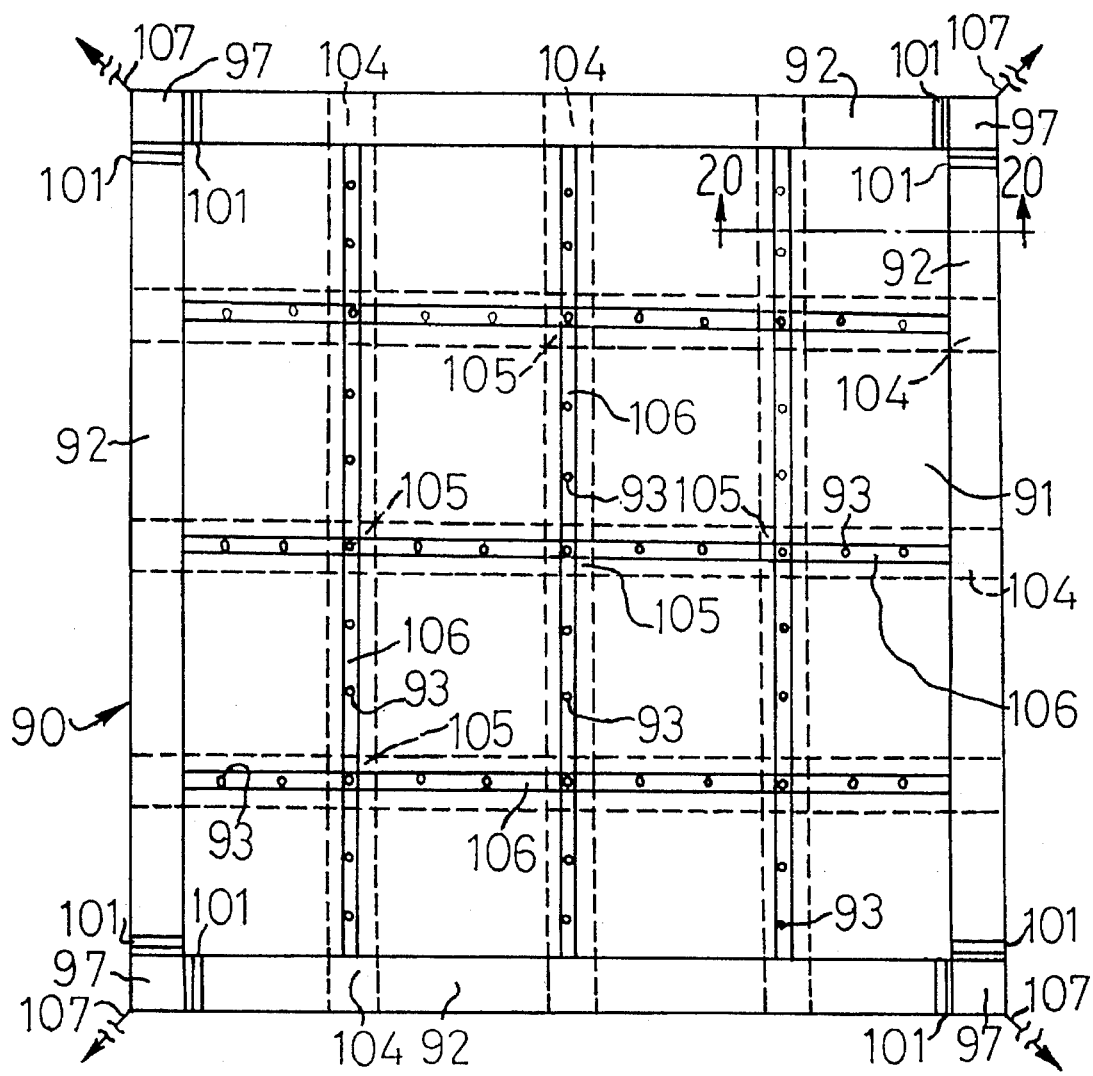
FIG. 19 is a plan view showing the floating structure according to the fourth preferred embodiment.
Figure 20:
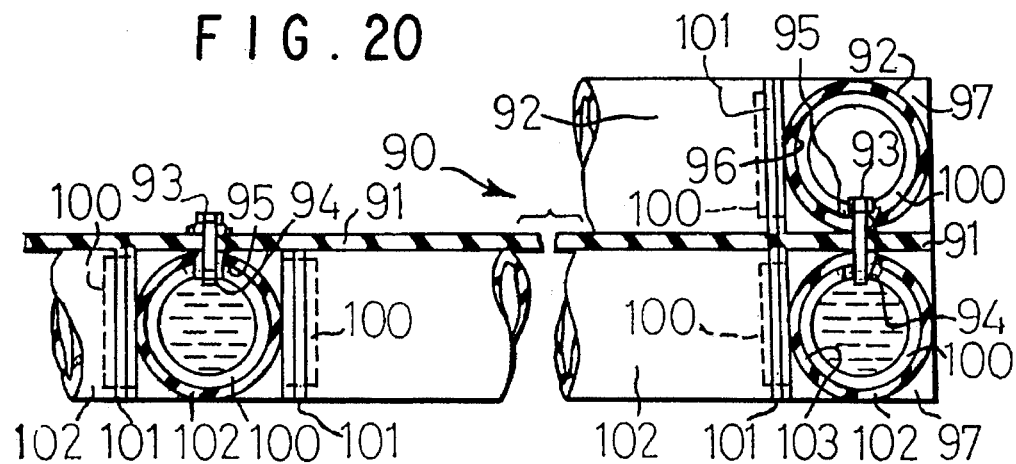
FIG. 20 is an enlarged sectional view taken substantially along line 20—20 of FIG. 19 showing the floating structure according to the fourth preferred embodiment.
Figure 21:
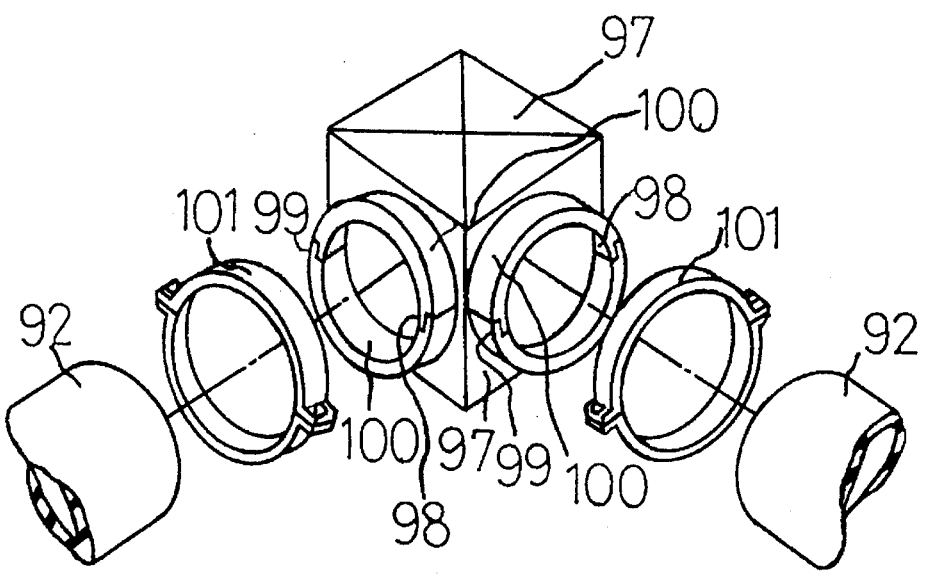
FIG. 21 is an exploded perspective view showing a yoked type joint according to the fourth preferred embodiment.
Figure 22:
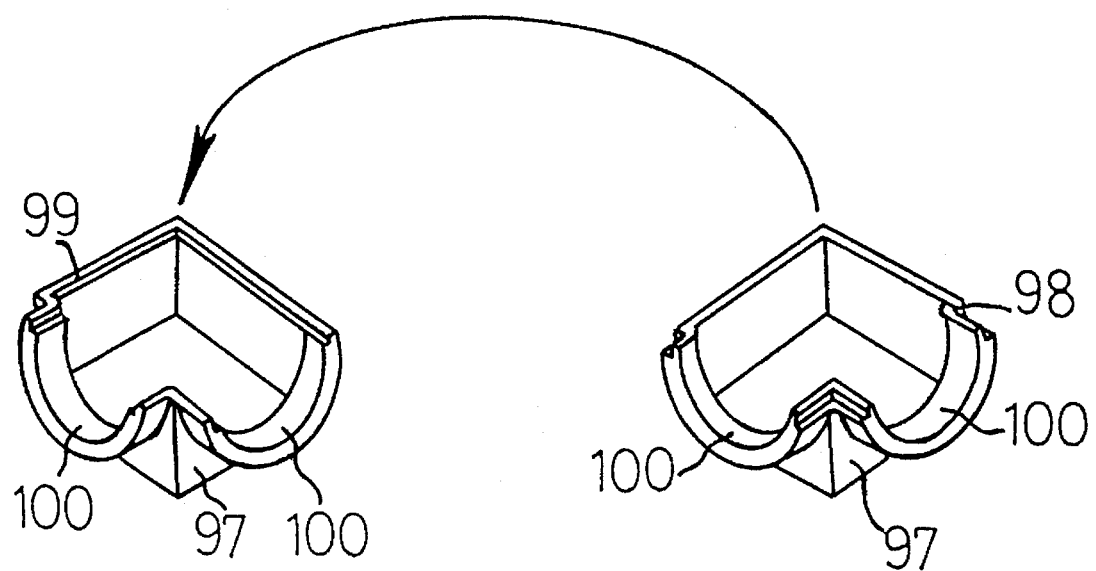
FIG. 22 is a view showing the separate condition of a yoked type joint according to the fourth preferred embodiment.
Figure 23:
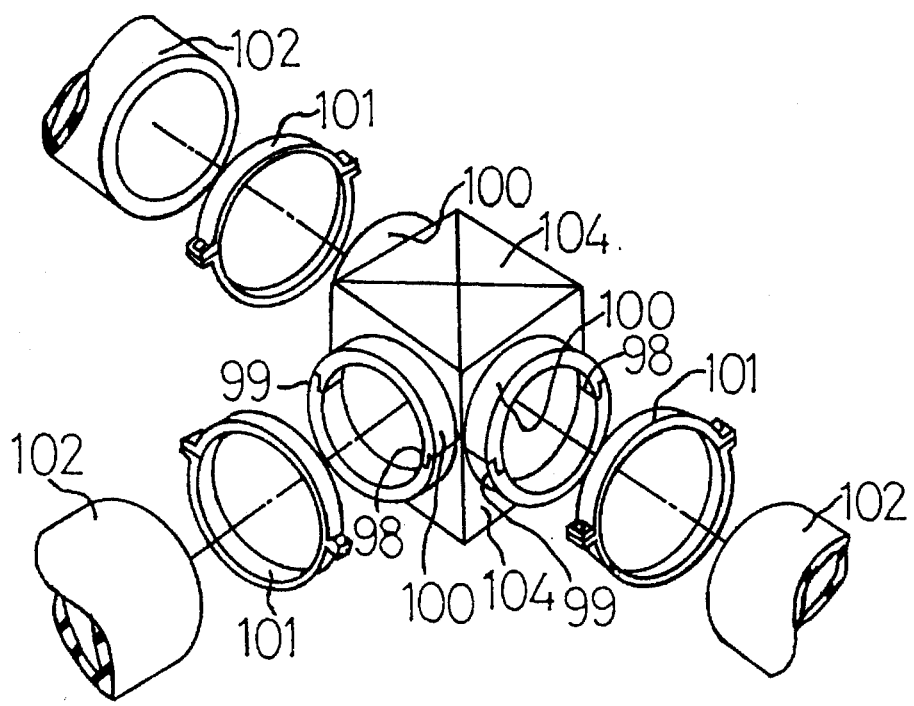
FIG. 23 is an exploded, partially broken perspective view showing a Y-formed joint according to the fourth preferred embodiment.
Figure 24:
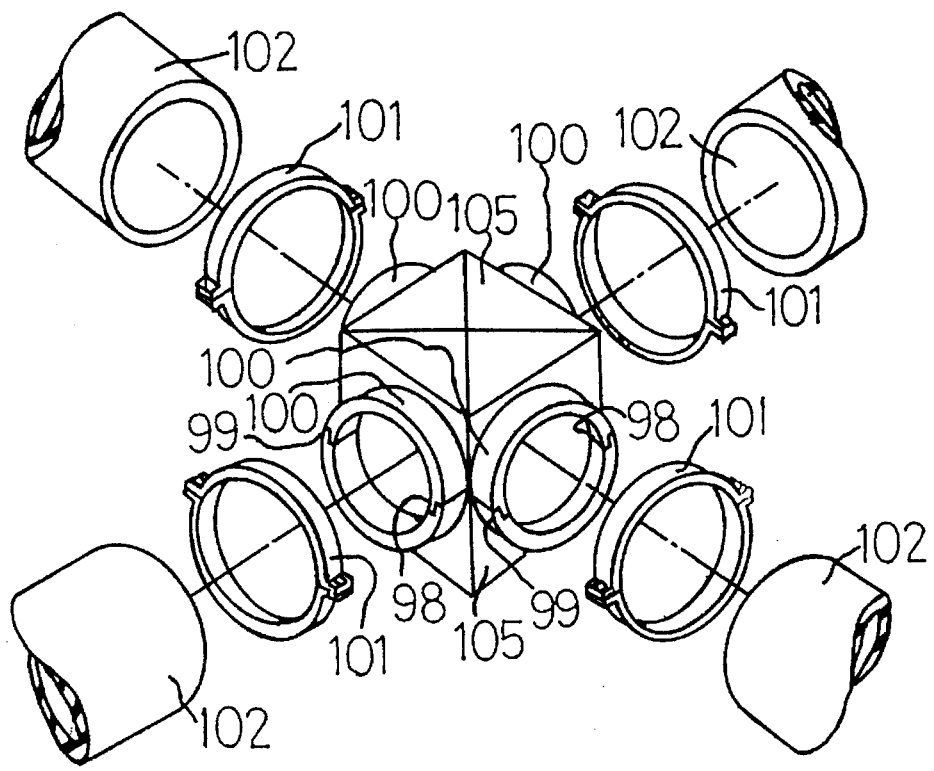
FIG. 24 is an exploded, partially broken perspective view showing an X-formed joint according to the fourth preferred embodiment.
Figure 25:
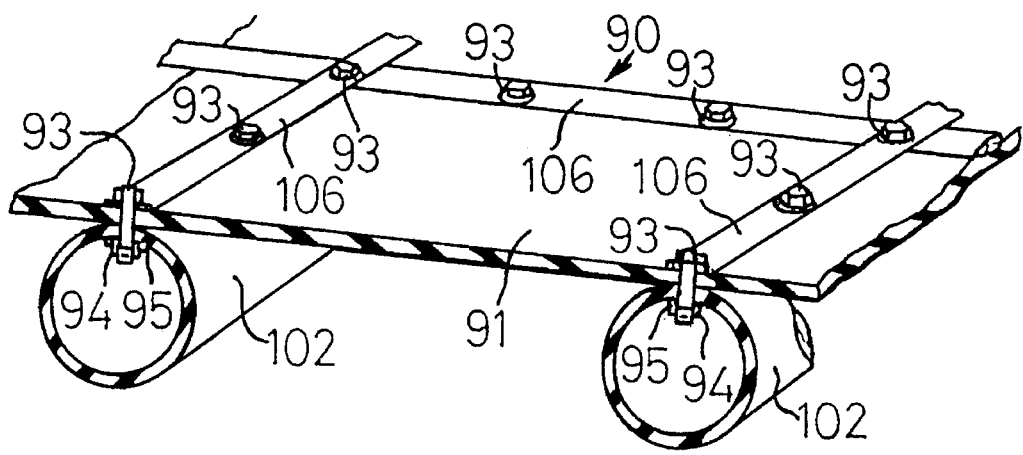
FIG. 25 is a perspective view showing the connecting relation between the pressure pipe and the rubber sheet according to the fourth preferred embodiment.

A fourth preferred embodiment discloses an imaginary looking device of the floating structure. As shown in FIG. 19, the floating structure 90 is a square in which one side is about 50 m in length. The sheet is a square shape in which one side is about 50 m in length, the thickness thereof is about 5 mm and the sheet includes a rubber sheet 91. The rubber sheet 91 is appropriately plate shaped in which the bottom portion spreads over the water surface such as sea surface or lake surface. As shown in FIG. 20, each of four cross-sectional circular hollow pressurized tubes 92 is integrally fixed as a water-proof wall to each of four marginal portions. The rubber sheet 91 is airtightly fixed to the pressure tube 92 by a bolt 93 and a nut 94 through a sealing member 95. The pressure tube 92 comprises a rubber sheet having a thickness of about 10 mm and an inner diameter of about 2 m, and has an air passage 96 filled with high-pressure air formed in the tube 92. Each of four tubes 92 is integrally and airtightly connected at the end portion by a yoked type joint 97 made of fiber-reinforced plastics. The yoked type joint 97, as shown in FIGS. 21 and 22, is a cube which is a hollow structure and is filled with high-pressure air to communicate with each tube 92. The joint 97 is half-shaped in the upward and downward directions, and rugged stepped portions 98 and 99 are disposed at the portion between two opposite end portions to airtightly connect with each other by the engagement and adhesives. A flange portion 100 for engaging and communicating with the tube 92 is disposed at a wall portion which is opposite to the end portion of each tube 92. The flange portion 100 is engaged with the tube 92 to airtightly communicate with each other by fastening of a ring band 101 from an outer periphery of the engaging portion of the pressure tube 92. As shown in FIG. 20, under the rubber sheet 91, cross-sectional circular hollow pressurized tube 102 in which one side is divided into four parts is integrally and airtightly fixed to four marginal portions of the rubber sheet 91 by a bolt 93, a nut 94 and a sealing member 95. The pressurized tube 102 is a rubber sheet having a thickness of about 10 mm and an inner diameter of about 2 m, and a water passage 103 for supplying high-pressure water to sea or lake is formed inside the tube 102. The tube 102 is integrally and airtightly connected at an end portion by a yoked type joint 97 made of fiber-reinforced plastics. As shown in FIG. 19, the sheet 91 framed by the tube 102 is further divided into a plurality of lattices. As shown in FIG. 23, the tube 102 is integrally and airtightly connected at the end portion by a Y-formed joint 104 made of fiber-reinforced plastics. The tube 102 is also integrally and airtightly connected at the end portion by an X-shaped joint 105 made of fiber-reinforced plastics. As shown in FIG. 25, the rubber sheet 91 is integrally and airtightly fixed to four marginal portions of the rubber sheet 91 through a steel streak or a reinforced member 106 made of a fiber-reinforced plastics, both of which are arranged in the axial direction, by a bolt 93, a nut 94 and a sealing member 95. As shown in FIG. 19, the floating structure 90 of the fourth preferred embodiment is built on the water surface since one end of the X-shaped joint 97 is connected to the bottom of the sea by way of a wire 107. The tube 92 is connected with a high pressure air supply means (not shown) at appropriate portions in order to be filled with high pressure air. Furthermore, the tube 102 is connected with a high pressure air supply means (not shown) at appropriate portions in order to be filled with high pressure air.

In the floating structure 90 of the fourth preferred embodiment, the tube 92 as a water proof wall filled with high pressure air is disposed at the upper surface of the rubber sheet 91 so that the tube 92 functions as a breakwater. Therefore, the rubber sheet 91 is prevented from being penetrated by water. The tube 92 is filled with high pressure air to act as an air bladder, and the tubes 92 and 102 make the floating structure 90 float on the water surface due to buoyancy. Since the tube 92 is arranged at the marginal portion of the rubber sheet 91 to form a square, the tube 92 acts to reinforce the frame. The tube 92 is prevented from being deformed since the elastic force and the high pressure air oppose the reaction of the outer force such as the flow of the wave or the water. Therefore, the rubber sheet 91 can maintain its proper posture, and the floating structure 90 can maintain its shape.

In the floating structure 90 of the fourth preferred embodiment, the tube 102 filled with high pressure water is disposed at the down surface of the rubber sheet 91 to form a square or a plurality of lattices, so the tube 102 acts to reinforce the frame. The tube 102 is prevented from being deformed since the elastic force and the high pressure air oppose the reaction of the outer force such as the flow of the wave or the water. Therefore, the rubber sheet 91 can maintain its proper posture, and the floating structure 90 can maintain its shape. Namely, the floating structure 90 improves its strength and durability. Since the floating structure 90 of the fourth preferred embodiment comprises the hollow tube 92 and the tube 102, high pressure air and water can be distributed to the tubes 92 and 102 without flow resistance. Furthermore, earth and sand 39 are put into the square area of the rubber sheet 91 framed by the tube 92 so that plants can be planted on the upper surface of the rubber sheet 91.

In the fourth preferred embodiment, the rubber sheet 91 is connected with the tubes 92 and 102 by the bolt 93 and the nut 94, but adhesives, a string, or a belt can be used for connecting the rubber sheet 91 and the tubes 92 and 102.

Fifth Preferred Embodiment

Figure 26:
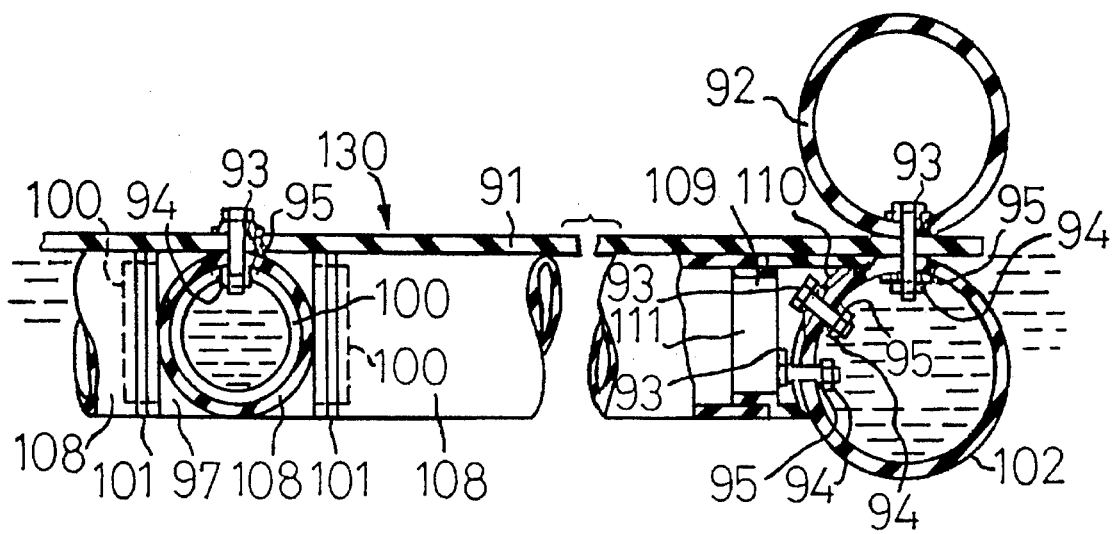
FIG. 26 is an enlarged sectional view showing the main portion according to the fifth preferred embodiment.

As shown in FIG. 26, a floating structure 130 of the fifth preferred embodiment is different from that of the fourth preferred embodiment. The inner diameter of a pressurized tube 102 fixed on the upper surface of a rubber sheet 91 and at the outer side of the marginal portion is 2 m, and the inner diameter of a pressurized tube 108 arranged at the inner side of the marginal portion and in a plurality of lattices is about 1 m. The tube 102 is crossed with the tube 108, and the tube 102 is airtightly connected with the tube 108 by a flange member 109. The flange member 109 forms a circular-arc surface 110 in accordance with the tube 102 at the bottom side, and the flange member 109 is integrally connected with the tube 102 by a bolt 93, a nut 94, and a sealing member 95. The flange member 109 has a flange portion 111 which is engaged with the inner space of the tube 108 at the opening side, and the flange member 109 is integrally engaged with the flange portion 111 by adhesives. Other components of the floating structure of the fifth preferred embodiment are almost the same as those of the floating structure of the fourth preferred embodiment.

As compared with the floating structure of the fourth preferred embodiment, the floating structure 130 of the fifth preferred embodiment has a greater number of lattices due to the tube 108 to improve the strength. Furthermore, the tube 102 is integrally connected with the tube 108 by the flange member 109 to simplify the joint. Other effects of the floating structure of the fifth preferred embodiment are almost the same as those of the floating structure of the fourth preferred embodiment.

Sixth Preferred Embodiment

Figure 27:
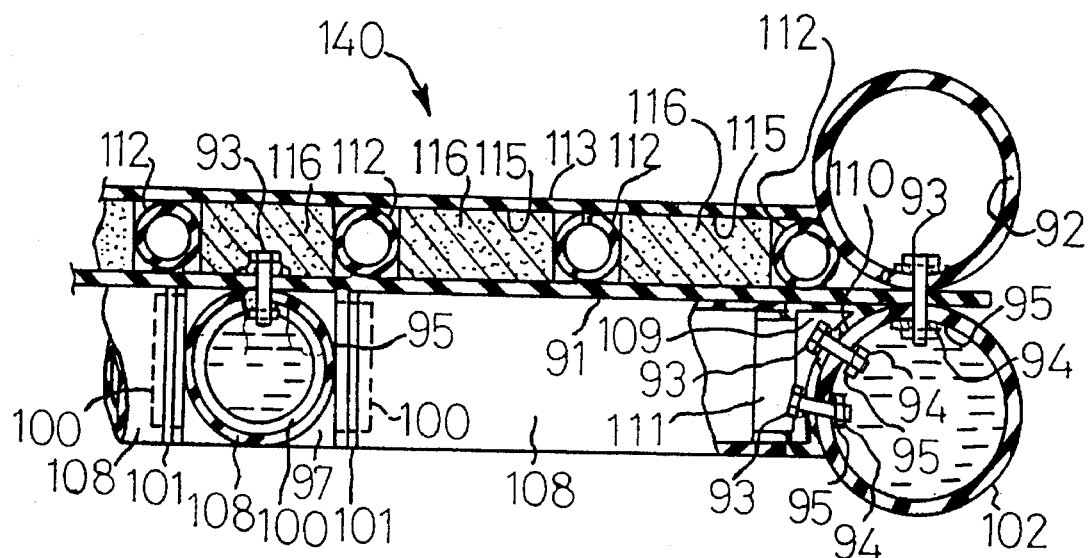
FIG. 27 is an enlarged sectional view showing the main portion according to the sixth preferred embodiment.
Figure 28:
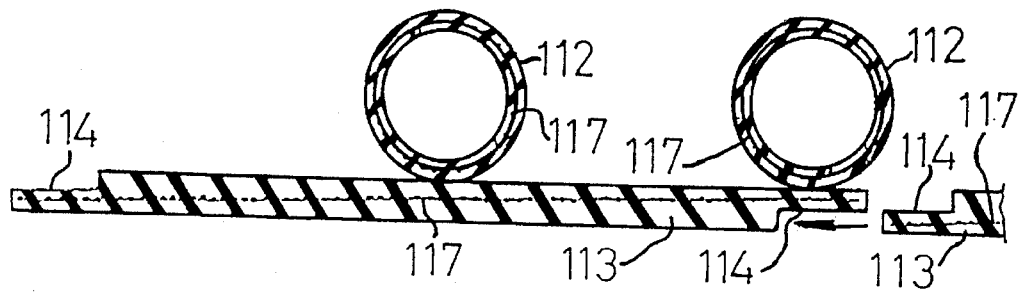
FIG. 28 is an enlarged sectional view showing a partial portion according to the sixth preferred embodiment.

As shown in FIGS. 27 and 28, a floating structure 140 of the sixth preferred embodiment is different from that of the fifth preferred embodiment. A pressurized tube 112 is formed in a plurality of lattices on the upper surface of the rubber sheet 91. The tube 112 is filled with the pressurized air and has a smaller diameter than that of the tube 108. A part of the outer wall of the tube 112 is integrally connected with a divided rubber sheet 113 by adhesives. The rubber sheet 113 is thinner than the rubber sheet 91. A stepped portion 114 is formed on the edge portion of each rubber sheet 113, and one rubber sheet 113 is integrally connected with the other rubber sheet 113 by adhesives at the stepped portion 114. A styrene foam 116 is filled within a space portion 115 framed by the rubber sheets 91 and 113 in the pressure tube 112. A reinforced fiber 117 is installed within the inside of the pressure tube 112 and the rubber sheet 113 to improve strength. Other components of the floating structure of the sixth preferred embodiment are almost the same as those of the floating structure of the fifth preferred embodiment.

As compared with the floating structure of the fifth preferred embodiment, the floating structure 140 of the sixth preferred embodiment improves its rigidity due to the pressure tube 112 filled with high pressure air and the styrene foam 116. Furthermore, the floating structure 140 improves its buoyancy.

Other effects of the floating structure of the sixth preferred embodiment is almost the same as those of the floating structure of the fifth preferred embodiment.

Seventh Preferred Embodiment

Figure 29:
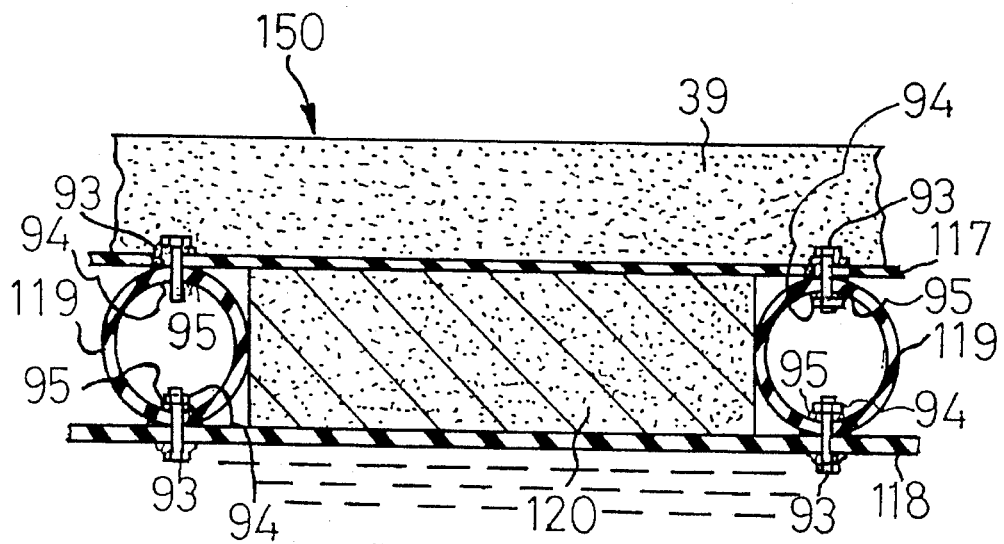
FIG. 29 is an enlarged sectional view showing a main portion according to the seventh preferred embodiment.

As shown in FIG. 29, a floating structure 150 of the seventh preferred embodiment is different from those of the above preferred embodiments. The floating structure 150 comprises a thin rubber sheet 117, a thick rubber sheet 118, a pressurized tube 119 which is filled with pressure fluid and formed in a plurality of lattices, and styrene foam 120 which fills a clearance. The tube 119 and the rubber sheets 117, 118 are airtightly connected with each other by a bolt 93, a nut 94 and a sealing member 95. Earth and sand 39 is accumulated on the upper surface of the rubber sheet 117. Other components of the floating structure of the seventh preferred embodiment are almost the same as those of the floating structure of each of the other preferred embodiments.

The bottom portion of the floating structure 150 is covered with the rubber sheet 118 so that resistance to water is remarkably reduced as compared with each preferred embodiment.

Other effects of the floating structure of the seventh preferred embodiment are almost the same as those of the floating structure of each preferred embodiment.

Figure 30:
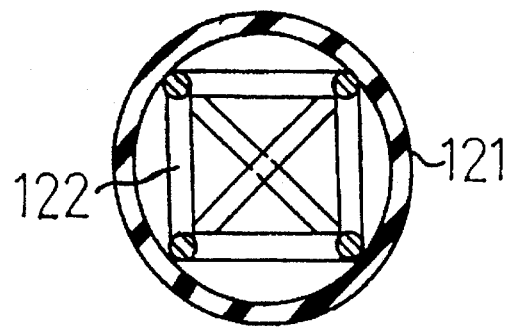
FIG. 30 is a sectional view showing the pressure pipe according to the seventh preferred embodiment.

As shown in FIG. 30, a reinforced member 122 made of steel pipe is attached to the inside of a pressure tube 121 so that the pressure tube 121 can resist to outer action such as water flow or wave. Therefore, the pressure tube 121 is suitably disposed to the most outer periphery of the floating structure.

Figure 31:
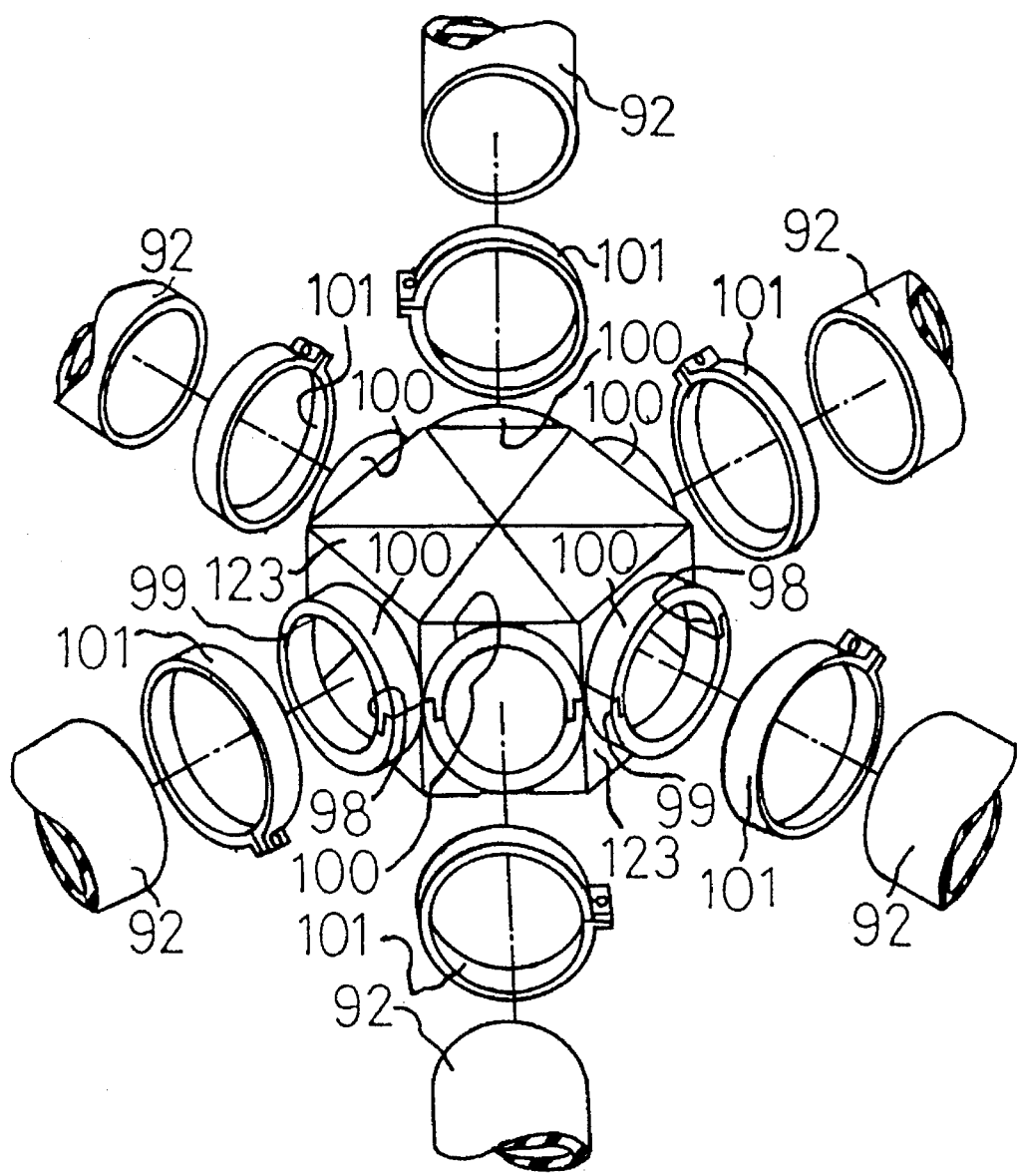
FIG. 31 is a partially broken perspective view showing a six-legged joint according to the seventh preferred embodiment.

As shown in FIG. 31, the pressure tube forms triangle shape due to a six-legged joint 123 made of plastic while the above pressure tube forms a square. The joint 123 can be a yoked type joint or Y-formed joint. These joints enables the pressure tube to form a square, a pentagon, a hexagon, or a combination thereof.

Eighth Preferred Embodiment

Figure 32:
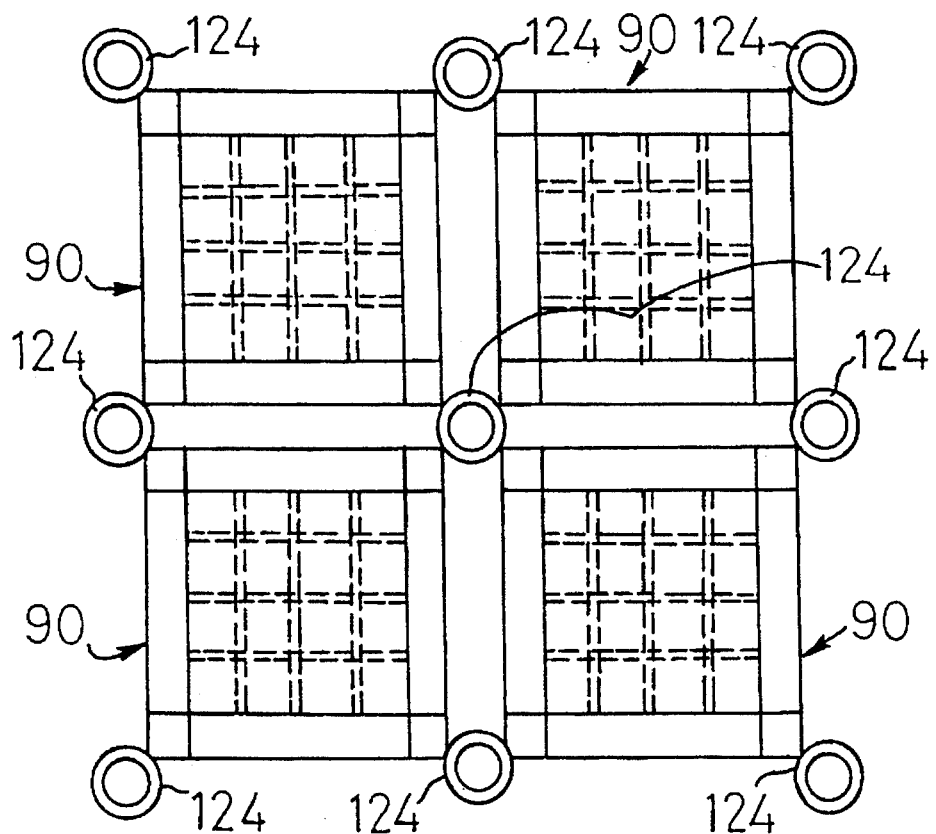
FIG. 32 is a plan view showing the arrangement of a plurality of floating structures according to the eighth preferred embodiment.

In the eighth preferred embodiment, the floating structure 90 of the fourth preferred embodiment is used. As shown in FIG. 32, a plurality of floating structures 90 can be arranged by way of hollow cylindrical buoy 124.

Figure 33:
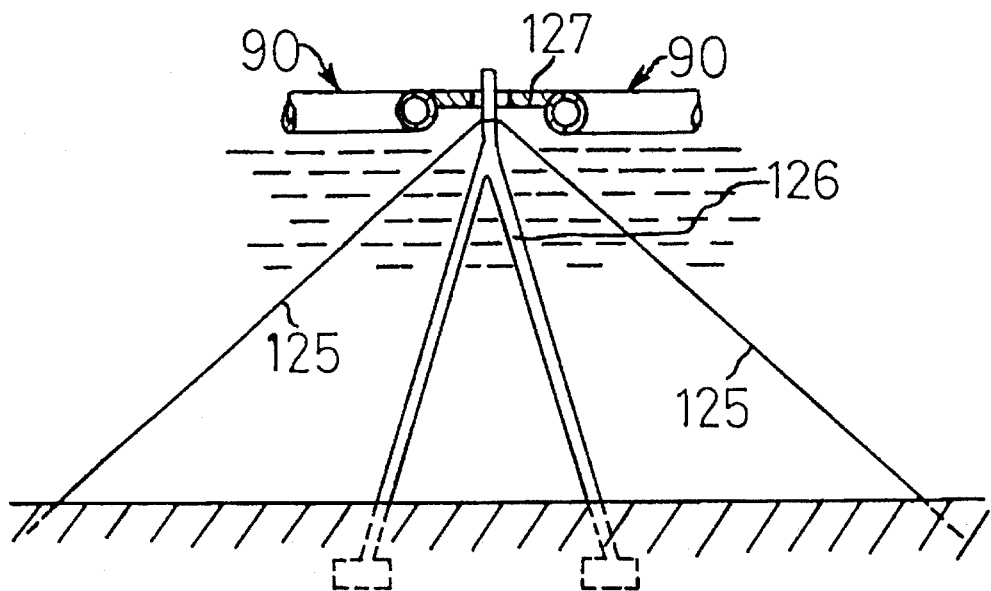
FIG. 33 is a schematic view showing the attached condition of the plurality of floating structures according to the eighth preferred embodiment.

The floating structure is fixed to the sea bottom by way of a wire as shown in the fourth preferred embodiment. As shown in FIG. 33, a rubber sheet 127 connected with each floating structure 90 is freely engaged with a column 126 which is reinforced by a wire 125 and built at sea bottom. The column 126 can be the column 2 of the first preferred embodiment.

Having now fully described the present invention, it will be apparent to one of ordinary skill in the art that many changes and modifications can be made thereto without departing from the spirit or scope of the present invention as set forth herein including the appended claims.

What is claimed as new and is desired to be secured by Letters Patent of the United States is:

1. A looking device of a floating structure comprising:
    a plurality of independent columns which are positioned a predetermined distance from each other, the columns having a bottom portion fixed to a bottom of the body of water wherein a top portion of the columns is projected to a position near the surface of the water;
    a cable body which is disposed between two neighboring columns and integrally connecting the bottom of one column and the top of the neighboring column; and
    wherein said floating structure is installed between said neighboring columns and floats on the surface of the water.

2. A locking device as claimed in claim 1, wherein said neighboring columns are secured together exclusively by a said cable body.

* * * * *